(12) United States Patent
Traband et al.

(10) Patent No.: US 8,195,610 B1
(45) Date of Patent: Jun. 5, 2012

(54) METHOD AND APPARATUS FOR CACHE MANAGEMENT OF DISTRIBUTED OBJECTS

(75) Inventors: Jonathan Jay Traband, Oakland, CA (US); Ward Raymond Bell, Richmond, CA (US); Albert Szu-chi Wang, San Francicso, CA (US)

(73) Assignee: IdeaBlade, Inc., Emeryville, CA (US)

( * ) Notice: Subject to any disclaimer, the term of this patent is extended or adjusted under 35 U.S.C. 154(b) by 902 days.

(21) Appl. No.: 11/745,933

(22) Filed: May 8, 2007

(51) Int. Cl.
*G06F 7/00* (2006.01)

(52) U.S. Cl. .......................................... 707/638; 707/695
(58) Field of Classification Search .................. 707/616, 707/638
See application file for complete search history.

(56) References Cited

U.S. PATENT DOCUMENTS

| | | | |
|---|---|---|---|
| 6,295,541 B1 * | 9/2001 | Bodnar et al. ................. | 707/203 |
| 6,427,234 B1 * | 7/2002 | Chambers et al. ............ | 717/140 |
| 6,487,560 B1 * | 11/2002 | LaRue et al. .................. | 707/203 |
| 6,493,727 B1 * | 12/2002 | Huang et al. .................. | 707/610 |
| 6,507,853 B2 * | 1/2003 | Bamford et al. ............... | 707/674 |
| 6,516,327 B1 * | 2/2003 | Zondervan et al. ........... | 707/200 |
| 7,243,136 B2 * | 7/2007 | Huston et al. ................. | 709/217 |
| 7,287,256 B1 * | 10/2007 | Lozben et al. ................. | 719/316 |
| 7,577,687 B2 * | 8/2009 | Bank et al. ..................... | 707/203 |
| 7,774,307 B2 * | 8/2010 | Ju et al. ......................... | 707/616 |
| 7,778,962 B2 * | 8/2010 | Shah et al. ..................... | 707/610 |
| 7,908,247 B2 * | 3/2011 | Ngo et al. ...................... | 707/638 |
| 7,930,278 B2 * | 4/2011 | Chandrasekaran et al. .. | 707/695 |
| 7,945,542 B2 * | 5/2011 | Bakey ........................... | 707/695 |

* cited by examiner

*Primary Examiner* — Christyann Pulliam
(74) *Attorney, Agent, or Firm* — Heimlich Law, PC; Alan Heimlich, Esq.

(57) ABSTRACT

A method and apparatus for cache management of distributed objects have been disclosed. A query strategy, based on a fetch strategy and a merge strategy, may be used to query a database and reconcile data in a local cache. In one approach, a merge action depends upon whether an entity was added, deleted, or changed relative to the original version of the entity as it was last fetched.

15 Claims, 19 Drawing Sheets

/—700

| Strategy 702 | Action when cached entity has pending changes 704 |
|---|---|
| PreserveChanges 706 | 707<br>Preserves the exact state of the cached entity. We won't be able to save the changes if the entity is obsolete. |
| OverwriteChanges 708 | 709<br>Overwrites the cached entity with data from the data source and marks it Unchanged. |
| PreserveChangesUnless OriginalObsolete 710 | 711<br>Preserves the persistent state of the cached entity if the entity is up-to-date. Overwrites entity if it is obsolete and marks it Unchanged. |
| PreserveChangesUpdateOriginal 712 | 713<br>Preserves the persistent state of the cached entity whether it is up-to-date or not. The PM turns a non-up-to-date changed entity into an up-to-date changed entity by overwriting the entity's original version with the just fetched values in the data source. Barring additional external updates, the entity can be saved without a concurrency violation. |
| NotApplicable 714 | 715<br>No merge action applies because there is no data source data.<br>This merge strategy must be used - and may only be used - with the CacheOnly fetch strategy. |

| Strategy 502 | Action 504 |
|---|---|
| Normal 506 | 507<br><br>Search the cache first and then search the data source, excluding items found in the cache.<br><br>Preserves cached entity changes; if we have a pending change (add, modify, delete), we will ignore conflicting values from the data source. |
| CacheOnly 508 | 509<br><br>Search the cache only. Data source values are irrelevant. This query has no cache side-effects. |
| DataSourceOnly 510 | 511<br><br>Search only in the data source, overwriting corresponding entities in the cache even if they have pending changes. |
| DataSourceThenCache 512 | 513<br><br>Search the data source first, overwriting corresponding entities in the cache even if they have pending changes. Then search the cache for entities that satisfy the query but are not in the data source. |

| Strategy 602 | Action 604 |
|---|---|
| CacheThenDataSource 606 | 607<br>Search the cache first and then search the data source for entities not already found in the cache. |
| CacheOnly 608 | 609<br>Search the cache only. Ignore the data source. |
| DataSourceOnly 610 | 611<br>Search only in the data source; return only the entities found in the data source. |
| DataSourceThenCache 612 | 613<br>Search the data source first and then search the cache for entities that satisfy the query but are not in the data source. |

FIG. 6

| Strategy 702 | Action when cached entity has pending changes 704 |
|---|---|
| PreserveChanges 706 | 707<br>Preserves the exact state of the cached entity. We won't be able to save the changes if the entity is obsolete. |
| OverwriteChanges 708 | 709<br>Overwrites the cached entity with data from the data source and marks it Unchanged. |
| PreserveChangesUnless OriginalObsolete 710 | 711<br>Preserves the persistent state of the cached entity if the entity is up-to-date. Overwrites entity if it is obsolete and marks it Unchanged. |
| PreserveChangesUpdateOriginal 712 | 713<br>Preserves the persistent state of the cached entity whether it is up-to-date or not.<br>The PM turns a non-up-to-date changed entity into an up-to-date changed entity by overwriting the entity's original version with the just fetched values in the data source. Barring additional external updates, the entity can be saved without a concurrency violation. |
| NotApplicable 714 | 715<br>No merge action applies because there is no data source data.<br>This merge strategy must be used - and may only be used - with the CacheOnly fetch strategy. |

FIG. 7

| Query Strategy 802 | Fetch Strategy 804 | Merge Strategy 806 |
|---|---|---|
| Normal 810 | CacheThenDataSource 812 | PreserveChanges 814 |
| CacheOnly 820 | CacheOnly 822 | NotApplicable 824 |
| DataSourceOnly 830 | DataSourceOnly 832 | OverwriteChanges 834 |
| DataSourceThenCache 840 | DataSourceThenCache 842 | OverwriteChanges 844 |

FIG. 8

```
┌─────────────────────┐
│  Define one or more │
│   merge strategies  │
│                 904 │
└─────────────────────┘

┌─────────────────────┐
│  Define one or more │
│   fetch strategies  │
│                 902 │
└─────────────────────┘
                              ┌─────────────────────┐
                              │  Define one or more │
                              │   query strategies  │
                              │                 906 │
                              └─────────────────────┘
```

FIG. 9

| Merge Strategy 1502 | Is entity Obsolete? 1504 | | RowState before merge 1506 | | | | | Is entity obsolete after merge? 1518 |
|---|---|---|---|---|---|---|---|---|
| | | | Unmodified 1508 | Added 1510 | Deleted 1512 | Detached 1514 | Modified 1516 | |
| PreserveChanges 1520 | N | Cur. Ver. | OW | NC | NC | NC | NC | N |
| | | Orig. Ver. | OW | NC | NC | NC | NC | |
| | | RowState | U | A | DI | Dt | M | |
| | Y | Cur. Ver. | OW | NC | NC | NC | NC | Y |
| | | Orig. Ver. | OW | NC | NC | NC | NC | |
| | | RowState | U | A | DI | Dt | M | |
| OverwriteChanges 1530 | Y or N | Cur. Ver. | OW | OW | OW | OW | OW | N |
| | | Orig. Ver. | OW | OW | OW | OW | OW | |
| | | RowState | U | U | U | U | U | |
| PreserveChangesUnlesOriginalObsolete 1540 | N | Cur. Ver. | OW | N/A | NC | NC | NC | N |
| | | Orig. Ver. | OW | | NC | NC | NC | |
| | | RowState | U | | DI | Dt | M | |
| | Y | Cur. Ver. | OW | OW | OW | OW | OW | N |
| | | Orig. Ver. | OW | OW | OW | OW | OW | |
| | | RowState | U | U | U | U | U | |
| PreserveChangesUpdateOriginal 1550 | Y or N | Cur. Ver. | OW | NC | NC | NC | NC | N |
| | | Orig. Ver. | OW | OW | OW | OW | OW | |
| | | RowState | U | M | DI | Dt | M | |
| PreserveEntityIfFoundInCache 1560 | N | Cur. Ver. | NC | NC | NC | NC | NC | N |
| | | Orig. Ver. | NC | NC | NC | NC | NC | |
| | | RowState | U | A | DI | Dt | M | |
| | Y | Cur. Ver. | NC | NC | NC | NC | NC | Y |
| | | Orig. Ver. | NC | NC | NC | NC | NC | |
| | | RowState | U | A | DI | Dt | M | |

| Merge Strategy 1602 | | RowState before merge 1606 | | | | |
| --- | --- | --- | --- | --- | --- | --- |
| | | Unmodified 1608 | Added 1610 | Deleted 1612 | Detached 1614 | Modified 1616 |
| PreserveChanges 1620 | Cur. Ver. | N/A | NC | NC | NC | NC |
| | Orig. Ver. | N/A | NC | NC | NC | NC |
| | RowState | Remove | A | Dl | Dt | M |
| OverwriteChanges 1630 | Cur. Ver. | N/A | NC | N/A | N/A | N/A |
| | Orig. Ver. | N/A | NC | N/A | N/A | N/A |
| | RowState | Remove | A | Remove | Remove | Remove |
| PreserveChangesUnlessOriginalObsolete 1640 | Cur. Ver. | N/A | NC | N/A | N/A | N/A |
| | Orig. Ver. | N/A | NC | N/A | N/A | N/A |
| | RowState | Remove | A | Remove | Remove | Remove |
| PreserveChangesUpdateOriginal 1650 | Cur. Ver. | N/A | NC | NC | NC | NC |
| | Orig. Ver. | N/A | NC | NC | NC | NC |
| | RowState | Remove | A | Dl | Dt | A |
| PreserveEntityIfFoundInCache 1660 | Cur. Ver. | NC | NC | NC | NC | NC |
| | Orig. Ver. | NC | NC | NC | NC | NC |
| | RowState | U | A | Dl | Dt | M |

FIG. 16

METHOD AND APPARATUS FOR CACHE MANAGEMENT OF DISTRIBUTED OBJECTS

FIELD OF THE INVENTION

The present invention pertains to distributed objects. More particularly, the present invention relates to a method and apparatus for cache management of distributed objects.

BACKGROUND OF THE INVENTION

Within the context of an object oriented software application, it is often important to retrieve or "query" objects from a variety of external data sources and convert or "map" them into "entity" objects or "entities". These entities are then available for modification by a local application and later may be saved back to one or more of the external datastores.

Various problems may arise during the process of attempting to perform such queries, especially in the context of ensuring that the state of any entities in the local datastore are such that any modifications, additions, or deletions made to these entities can be later applied back to their original datastores. This may present a problem.

For example, determining whether or not to query an external datastore if some subset of the entities being queried already exists within a local datastore. This may present a problem.

For example, determining how to reconcile the data in an entity when it may have been modified in the local datastore, the external datastore, or both. This may present a problem.

For example, determining how to combine the results of an external query with the results of the same query running against the internal datastore, given that the two (or more) result sets have both overlapping and nonoverlapping regions. This may present a problem.

For example, determining if there should be dynamic solutions to the ordering, reconciliation and combination problems mentioned above. This may present a problem.

Microsoft is registered trademark of Microsoft Corporation. (.Net logo) is a trademark of Microsoft Corporation. DevForce is a registered trademark of IdeaBlade, Inc. IEEE is a registered trademark of The Institute of Electrical and Electronics Engineers, Inc. FireWire is a registered trademark of APPLE INC.

BRIEF DESCRIPTION OF THE DRAWINGS

The invention is illustrated by way of example and not limitation in the figures of the accompanying drawings in which:

FIG. 5 illustrates one embodiment of the present invention showing four query strategies;

FIG. 6 illustrates one embodiment of the present invention showing four fetch strategies;

FIG. 7 illustrates one embodiment of the present invention showing four merge strategies;

FIG. 8 illustrates one embodiment of the present invention showing query strategies defined in terms of merge and fetch strategies;

FIG. 9 illustrates one embodiment of the present invention showing defining one or more strategies;

FIG. 15 illustrates one embodiment of the present invention showing in chart form different merge strategies and the effect on a cached entity that exists in a datasource;

FIG. 16 illustrates one embodiment of the present invention showing in chart form different merge strategies and the effect on a cached entity that does not exist in a datasource;

DETAILED DESCRIPTION

Figure 1:
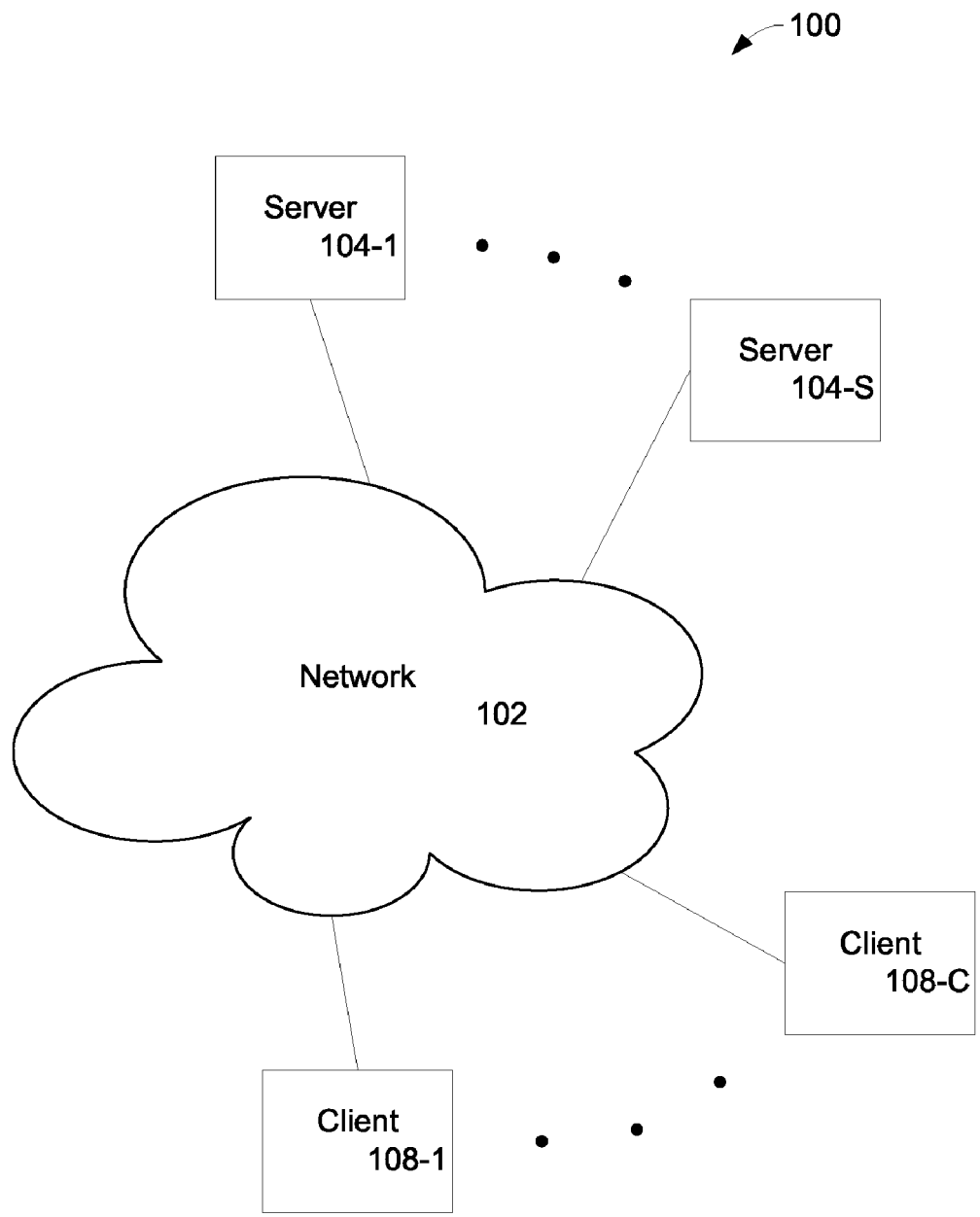
FIG. 1 illustrates a network environment in which the method and apparatus of the invention may be implemented.

In one embodiment the present invention provides a mechanism that allows fine grained control over the update and synchronization of a modifiable local datastore with the results of heterogeneous queries applied to a variety of external data sources.

An "entity" or similar terms, for the purposes of this document is any object that satisfies the following criteria.

(1) Each entity can be uniquely identified by an internally contained key. This will be referred to as the entity's "identity" or "key". Within a given datastore it is important to insure that, at most only a single instance of each of these "entities" is present at any given point in time.

(2) An "entity" is "versionable", meaning that more than one instance of the entity, (or its associated source data) may exist at one time in the context of different datastores. For sake of discussion, we stipulate that some mechanism be available to determine which version is the most "up-to-date" or is "obsolete" within the context of a given local datastore and that it is possible to make any given entity the most "up-to-date". (One of skill in the art is familiar with many such approaches.)

(3) Any given "entity" may reside in more than one location. This implies that it is possible for multiple datastores to contain the same or possibly conflicting versions of a single entity.

(4) Every entity exists in one or more states in the local datastore. For example, if the local datastore has four states they may be, for example;

a. Unchanged: Entity has not been modified since it was last fetched from the datastore (also called Unmodified).

b. Modified: Entity has been modified since it was queried for.

c. Added: Entity was not queried for but is newly created and does not yet exist on any external datastore.

d. Deleted: Entity has been marked as deleted since being queried for and is scheduled for deletion once it gets applied.

To succinctly illustrate the present invention, a specific embodiment in the context of one or more specific examples will be used. One of skill in the art will appreciate that the techniques disclosed can be applied to any "object," "query," and "datastore."

The techniques disclosed relate to three related concepts; QueryStrategies, FetchStrategies, and MergeStrategies. In one embodiment of the invention, the implementation discussed is that within IdeaBlade's DevForce product and allows fine-grained control over the fetching, merging, and reconciliation of multiple data sources into a local datastore.

Within the DevForce product local datastores are represented by instances of the "PersistenceManager" class. Any given application may host any number of PersistenceManagers. Each PersistenceManager is capable of controlling the semantics of any query via an instance of a "QueryStrategy" class.

For the purposes of the following discussion the term "cache" is used to represent the local datastore as implemented by each instance of a PersistenceManager and "data source" is used to represent any external source of data. Note that there is no requirement that the external source of data be a relational database. The only requirement is that the "entities" can be retrieved as the result of a query. The mechanisms by which DevForce converts the results of a query into such entities are not the subject of this invention and are understood by those of skill in the art to be a component of any solution that attempts to map data from a data source into an "entity" type.

Much of the following discussion also involves the "versioning" capability of an entity. Versioning of an entity is closely tied to the concept of concurrency, or the ability to distinguish multiple versions of entities that share the same key and determine both whether a conflict exists and if so which version should "win". The mechanism by which concurrency is controlled is not part of this invention. To illustrate the invention the existence of a concurrency mechanism that meets the criteria stated above is assumed as such versioning capability is readily available and one of skill in the art will be aware of multiple approaches that may be used.

Specifically, the IdeaBlade DevForce implementation discussed below is built upon Microsoft's .NET Framework and includes code samples in both Microsoft's C# and VB (Visual Basic) programming languages. Within the IdeaBlade DevForce implementation, the .NET DataRowState and DataRowVersion properties on the DataRow class are used to maintain information regarding the version and state of every object in the local datastore. The DataRow class also maintains an image of the original version of the object when it was last retrieved from the datastore and also a current version of the object which may be modified by the application. The use of the DataRow class simplifies and standardizes the .NET implementation, but is by no means a requirement for the implementation of the overall methodology disclosed. The general techniques and concepts presented below are broadly applicable to any object oriented language or environment that involves the use of a local datastore sourced from a variety of external data sources.

The entities defined by DevForce use the .NET DataRow class to hold important information including the aforementioned DataRowState, DataRowVersion, the original version of the entity, and the current version of the entity. The current version is what most developers think of as the state of the entity. It is what the application generally modifies and what the user generally sees.

The original version, although not required for this implementation, is a convenient way to allow the application to roll-back or undo modifications to the entity. It also is a convenient way to keep track of the state of the entity as it was when queried from the datastore and is a convenient mechanism to determine if the entity is up-to-date (not obsolete) with the datastore. In other words, if the version of the entity in the remote datastore has changed since it was last queried into the local datastore/cache, then the local entity will be out-of-date (obsolete) and will not be able to be saved to the database without invoking what is commonly known as an optimistic concurrency violation (i.e. you would destroy someone else's changes).

DevForce uses the information about the original version and the current RowState of the current version to determine the appropriate action to be taken when merging data from the remote datastore into the local cache. The use of the original version is a matter of convenience and one with skill in the art will appreciate that this information (version and RowState) may be derived using other approaches.

Query Strategies

When the PersistenceManager (PM) performs a query, it follows a query strategy.

We can supply a QueryStrategy object as an argument to many of the entity query overloads as in:

pm.GetEntities<Employee>(myQuery, myQueryStrategy); //C# pm.GetEntities(of Employee)(myQuery, myQueryStrategy) ' VB

If we don't specify a QueryStrategy, the PM uses the PM.DefaultQueryStrategy. Entity navigation is implemented with relation queries governed by the DefaultQueryStrategy.

The DefaultQueryStrategy is QueryStrategy.Normal but we can change that at will.

The QueryStrategy class has four static (shared in VB) properties that return the four most common strategies. Note that many other possible query strategies are possible and even necessary under various use cases, but the four listed below in Table 1 tend to be the most commonly needed.

TABLE 1

Common Query Strategy Objects

| Strategy | Action |
|---|---|
| Normal | Search the cache first and then search the data source, excluding items found in the cache. Preserves cached entity changes; if we have a pending change (add, modify, delete), we will ignore conflicting values from the data source. |
| CacheOnly | Search the cache only. Data source values are irrelevant. This query has no cache side-effects. |
| DataSourceOnly | Search only in the data source, overwriting corresponding entities in the cache even if they have pending changes. |
| DataSource-ThenCache | Search the data source first, overwriting corresponding entities in the cache even if they have pending changes. Then search the cache for entities that satisfy the query but are not in the data source. |

On close examination, we can see that the action consists of two parts:
1. How to fetch the entities
2. How to merge them into the cache when some of them are already there.

A QueryStrategy object delivers answers to both questions with its FetchStrategy and MergeStrategy properties. These properties return FetchStrategy and MergeStrategy enumeration values respectively.

Fetch Strategies

There are four fetch strategies as shown in Table 2.

TABLE 2

FetchStrategies

| Strategy | Action |
|---|---|
| CacheThenDataSource | Search the cache first and then search the data source for entities not already found in the cache. |
| CacheOnly | Search the cache only. Ignore the data source. |
| DataSourceOnly | Search only in the data source; return only the entities found in the data source. |
| DataSource-ThenCache | Search the data source first and then search the cache for entities that satisfy the query but are not in the data source. |

These seem straightforward, however, there are two additional cases that we need to account for.

First, if the client is disconnected from the data source, all fetches read from the cache only.

Second, a DataSourceOnly query returns just the entities that can be found in the data source. It ignores matching entities in the cache, even if they satisfy the query.

If the datasource cannot be found when using DataSourceOnly or DataSourceThenCache, then an exception is thrown (which may be optionally suppressed).

Merge Strategies

There are five merge strategies that dictate what the PersistenceManager should do when the cached entity and its corresponding data source entity are not perfectly in sync. (The data source entity is a convenient short hand for that set of data in the data source that corresponds to the data within the cached entity. The two are said to be mates.)

All strategies (except NotApplicable) replace an unmodified cached entity completely. Things gets interesting when the cached entity is new, modified, or scheduled for deletion (these states correspond to the .NET DataRowState enumerations: Added, Modified, and Deleted.)

Much depends upon whether the original version of the changed entity is identical to the entity's most recent state in the data source. (Recall that the entity in cache holds both the current potentially modified state of the entity as well as the original state of the entity when it was last fetched from the datastore.) If they are the same—if no one has updated the data source since the entity was fetched—we could pass optimistic concurrency checks and save this entity successfully.

If some person (or some process) has updated the entity in the data source, our cached copy is now "obsolete". Its original version in cache no longer matches the state of the entity in the data source. If we try to save it, the save will fail due to a concurrency violation. Our pending change "should be" rejected (these considerations are moot if our entity's class does not enforce concurrency checking).

Table 3 summarizes the different merge strategies.

TABLE 3

MergeStrategies

| Strategy | Action when cached entity has pending changes |
|---|---|
| PreserveChanges | Preserves the exact state of the cached entity. We won't be able to save the changes if the entity is obsolete. |
| OverwriteChanges | Overwrites the cached entity with data from the data source and marks it Unchanged. |
| PreservechangesUnlessOriginalObsolete | Preserves the persistent state of the cached entity if the entity is not obsolete. Overwrites entity if it is obsolete and marks it Unchanged. |
| PreserveChanges-UpdateOriginal | Preserves the persistent state of the cached entity depending on whether it is obsolete. The PM turns an obsolete changed entity into a non-obsolete (or up-to-date) changed entity by overwriting the entity's original version with the just fetched values in the data source. Barring additional external updates, the entity can be saved without a concurrency violation. |
| NotApplicable | No merge action applies because there is no data source data. This merge strategy must be used - and may only be used - with the CacheOnly fetch strategy. |

Strategies Relationship

Revisiting the four predefined QueryStrategy objects we see how they can be defined in terms of these fetch and merge strategies:

TABLE 4

Fetch and merge strategies of the common query strategies

| Query Strategy | Fetch Strategy | Merge Strategy |
|---|---|---|
| Normal | CacheThenDataSource | PreserveChanges |
| CacheOnly | CacheOnly | NotApplicable |
| DataSourceOnly | DataSourceOnly | OverwriteChanges |
| DataSourceThenCache | DataSourceThenCache | OverwriteChanges |

Creating a QueryStrategy

One can create their own QueryStrategy by supplying the fetch and merge strategy enumerations to its constructor. Picking the fetch strategy is generally straightforward. Picking the merge strategy requires a thorough understanding of the merge mechanics.

Merge Strategy In Detail

What happens during the merge of a data source entity and a cached entity depends upon the answers to three questions:
(1) Is the entity up-to-date or obsolete?
(2) How has it changed?
(3) Is the entity represented in the data source?
(1) Is the Entity Up-to-Date or Obsolete Relative to the Data Source?

We compare the cached entity's concurrency column property value to that of its data source entity. If the two are the same, the cached entity is up-to-date; if they differ, the cached entity is obsolete.

As it happens, the cached entity may have two concurrency column property values, for example, a current one and an original one. The value of the concurrency column in the current version is of little value. It is the value of the concurrency column in the original version (indicating the version of the entity when it was last fetched) that counts.

For example, a DevForce entity has an original version and a current version of its persistent state. We can get to one or the other by means of a DataRowVersion indexer. (.NET provides a DataRowVersion enumeration. The values of interest are Original and Current.) In principle, the original version holds the state of the entity as it was when we last read it from the data source. (We can make the object change its original state so that it no longer accurately reflects the last fetched state. DevForce will alter the original state when necessary as we shall see infra.) The current version reflects our changes from this original version.

Again, DevForce determines if our cached entity is up-to-date or obsolete based on the original version of the concurrency column property value. Other mechanisms exist for determining the "obsoleteness" of a given entity; the DevForce implementation as described was chosen for its performance characteristics. The concept, as will be understood by one of skill in the art is that we have a mechanism for determining which "version" of the entity is the most up-to-date.

(2) How has it Changed?

The merge action depends upon whether the entity was added, deleted, or changed relative to the original version of the entity as it was last fetched. Within the DevForce implementation we rely on an instance of the .NET DataRowState class to represent the state of each entity. Each DevForce entity has a RowState property (having possible values of Added, Deleted, Detached, Modified, and unchanged) that tells us if and how it has changed per our definitions stated earlier in this document. One of skill in the art will appreciate that other implementations of this concept are possible. Again, this implementation was chosen for performance and compliance with the latest .NET coding patterns and is in no way a requirement for the implementation of the overall methodology, nor is it a requirement or limitation of the present invention.

(3) Is the Entity Represented in the Data Source?

If there is a data source entity that corresponds to the cached entity, we may use the data from the data source entity to change the cached entity in some way.

If we do not find a matching data source entity, we have to decide what to do with the cached entity. Perhaps someone deleted the data source entity in which case we might want to discard the cached entity. If we, on the other hand, want to save the cached entity, we will have to insert it into the data source rather than update the data source.

Merging when the Entity is in the Data Source

We will examine each strategy and describe the outcome based on:

(a) whether or not the cached entity is up-to-date, and
(b) the entity's RowState.

If the entity is unchanged, we can replace both its original and current versions with data from the data source entity.

Our remaining choices are summarized in the following Table 5.

TABLE 5

Merge strategy effect on the current version of the cached entity for a changed cached entity that exists in the data source

| Merge Strategy | Up-To-Date | Added | Deleted | Detached | Modified | Up-To-Date after merge |
|---|---|---|---|---|---|---|
| PreserveChanges | Y | NC | NC | NC | NC | Y |
|  | N | NC | NC | NC | NC | N |
| OverwriteChanges | Y or N | OW | OW | OW | OW | Y |
| PreserveChangesUnlessOriginalObsolete | Y | NA | NC | NC | NC | Y |
|  | N | OW | OW | OW | OW | Y |
| PreserveChangesUpdateOriginal | Y or N | NC | NC | NC | NC | Y |

NC = No change; preserve the current version values of the cached entity
OW = Overwrite the cached entity's current version values with data from the data source entity
NA = Not applicable; an "up-to-date" newly added entity cannot also exist in the data source.
Up-to-date after merge = 'Y' means the cached entity is "up-to-date" relative to the data source after the merge.

There are important artifacts not immediately observable from this table.

The entity's RowState may change after the merge. It will be marked Unmodified after merge with OverwriteChanges. It will be marked Unmodified after merge with PreserveChangesUnlessOriginalObsolete if the entity is obsolete. Note that deleted and detached entities are resurrected in both cases.

An added cached entity may be deemed "obsolete" if it already exists in the data source. (For example, the entity exists in the data source if the query returns an object with a matching primary key. If we think we created Employee with Id=3 and we fetch one with Id=3, someone beat us to it and used up that Id value. Our entity is obsolete.). We will not be able to insert that entity into the data source; we will have to update the data source instead.

The PreserveChangesUpdateOriginal strategy updates the original version of the entity with the most recent data in the datastore and enables us to force our changes into the data source even if the entity is obsolete. An added entity merged with PreserveChangesUpdateOriginal will be marked modified to denote that the entity may now contain changes that differ from the datastore.

These effects are summarized in the following Table 6.

TABLE 6

Merge strategy on the RowState after a merge for a changed cache entity.

| Merge Strategy | Up-To-Date | Added | Deleted | Detached | Modified |
|---|---|---|---|---|---|
| PreserveChanges | Y or N | A | D | Dt | M |
| OverwriteChanges | Y or N | U | U | U | U |
| PreserveChanges-UnlessOriginal-Obsolete | Y | NA | D | Dt | M |
|  | N | U | U | U | U |
| PreserveChanges-UpdateOriginal | Y or N | M | D | Dt | M |

A = Added,
D = Deleted,
Dt = Detached,
M = Modified,
U = Unchanged,
NA = Not applicable The merge may change the original version of a changed cached entity to match the data source values.

PreserveChanges never touches the original version.

The original version is always updated with the OverwriteChanges strategy.

The original version is updated with the PreserveChangesUnlessOriginalObsolete strategy if the entity is obsolete.

PreserveChangesUpdateOriginal updates the original version (but not the current version!) if the entity is obsolete. This step ensures that the cached entity appears up-to-date while preserving the pending changes.

These effects are summarized in the following Table 7.

TABLE 7

Merge strategy effect on the original version of the cached entity for a changed cached entity that exists in the data source

| MergeStrategy | Up-To-Date | Added | Deleted | Detached | Modified |
|---|---|---|---|---|---|
| PreserveChanges | Y or N | NC | NC | NC | NC |
| OverwriteChanges | Y or N | OW | OW | OW | OW |
| PreserveChanges-UnlessOriginal-Obsolete | Y | — | NC | NC | NC |
|  | N | OW | OW | OW | OW |
| PreserveChanges-UpdateOriginal | Y or N | OW | OW | OW | OW |

Merging when the Cached Entity is not in the Data Source

We begin by considering cached entities that are unchanged. If the query applied to the cache returns an unchanged entity, 'X', and the query applied to the data source did not return its mate, we can safely assume that 'X' was deleted after we fetched it. We can remove 'X' from the cache.

We turn next to changed cached entities where we must distinguish between a query that tests only for the primary key and one that tests for something other than the primary key.

If the query tests for anything other than the primary key, we can draw no conclusions from the fact that a cached entity was not found in the data source. (For example, what does it mean if we have an employee named "Sue" in cache and we don't find her in the data source? Perhaps someone deleted her from the data source. Maybe someone merely renamed her. Maybe we renamed her. The combinations are many.)

On the other hand, if we query for a primary key, for example Employee with Id=3, and we do not find that employee in the data source, we can be confident of a simple interpretation. A business object must have unique identity so if it isn't there, either it was never there or it has been deleted. (In this case, DevForce assumes that primary keys, once assigned in the data source, cannot change. If they are allowed to change, then the system should draw no conclusions and leave the entity alone.) What happens next depends upon the RowState of the cached entity and the merge strategy.

DevForce does nothing when it attempts to save an entity marked for deletion and it cannot find the data source entity to delete so the merge can leave this cached entity alone. It can also skip over the detached entities.

PreserveChanges forbids merge effects on changed entities. The entity stays put in the cache.

OverwriteChanges takes the data source as gospel. If the cached entity's RowState is modified and there is not an existing data source entity, then DevForce assumes the data source entity has been deleted and the cache should catch up with this reality. It removes the entity from the cache. (Removal from the cache is just that. The entity disappears from the cache and will not factor in a save. It does not mean "delete" which requires DevForce to try to delete the entity from the data source. It is an action neutral to the data source.)

On the other hand, if the cached entity is new (Added), we do not expect it to be in the data source. The entity remains "as is" in the cache, a candidate for insertion into the data source.

PreserveChangesUnlessOriginalObsolete behaves just like OverwriteChanges.

PreserveChangesUpdateOriginal strives to position the entity for a successful save. It must intervene to enable data source insertion of a modified entity by changing its RowState to Added. (Note: an update would fail because there is no data source entity to update.)

In summary (Table 8):

TABLE 8

Merge strategy consequences for a changed cached entity that does not exist in the data source

| Merge Strategy | Added | Modified |
|---|---|---|
| PreserveChanges | A | M |
| OverwriteChanges | A | R |
| PreserveChangesUnlessOriginalObsolete | A | R |
| PreserveChangesUpdateOriginal | A | A |

A = Added,
M = Modified,
R = Removed

In one embodiment of the present invention, handling these entities may be done as follows:

Given a non primary key query: Q
(1) Set X=result of Q against the data source
(2) Set Y=result of Q against the local datastore (after the query and merge, for example, as defined above)
(3) Set Z=Y−X using current version of Y (think of Z as notFoundInDatasource)
(4) Detach entities in Z where the RowState is "Unmodified"

Given a primary key query: Q
(1) Set X=result of Q against the data source
(2) Set Y=result of Q against the local datastore (after the query and merge, for example, as defined above)
(3) Set Z=Y−X using current version of Y (think of Z as notFoundInDatasource Then
(4) If PreserveChangesUpdateOriginal
 (a) Detach entities in Z where the RowState is "Unmodified"
 (b) Mark entities in Z as "Added" where the RowState is "Modified" and primary key has not changed
(5) Else If PreserveChanges
 (a) Detach entities in Z where the RowState is "Unmodified"
(6) Else If PreseveChangesUnlessOriginalObsolete or OverwriteChanges
 (a) Detach entities in Z where the RowState is not "Added" and primary key has not changed DataSourceOnly Subtleties There are some interesting results if we use a DataSourceOnly or DataSourceThenCache query with other than the OverwriteChanges merge strategy. Consider the following queries using the PreserveChanges merge strategy.

Suppose we hold the "Nancy" employee in cache. We change her name to "Sue" and then search the database for all Employees with first names beginning with 'S'. We will not get "Sue" because she is still "Nancy" in the database.

Suppose we search again but this time we search for first names beginning with 'N'. This time we get "Sue". This may be non-intuitive, but it is technically correct because the "Sue" in cache is still "Nancy" in the database. These behaviors, which may appear odd at first, are very important in some less common use cases and show the power of combining arbitrary fetch and merge strategies to achieve a specific behavior in the system.

Forced Re-fetch

There are a number of methods that help us re-fetch specific entities from their data sources. Among them are EntityList.ForceRefetch and PersistenceManger.RefetchEntities<T>. They assume the OverwriteChanges merge strategy, however, we can give them any of the other merge strategies. OverwriteChanges replaces the cached entities, overwriting our pending changes. We often want to (a) keep pending changes but (b) refresh copies of unmodified entities.

The PreserveChanges . . . strategies can help us achieve our purpose. Table 9 is a summary.

TABLE 9

PreserveChanges . . . strategies in a forced re-fetch

| Strategy | Description |
|---|---|
| Preservechanges | Replace unchanged entities but keep changed entities as they are. |
| PreserveChangesUnless OriginalObsolete | Replace unchanged entities and changed entities that are obsolete (i.e., that would fail an optimistic concurrency check if saved now). |
| PreserveChanges-UpdateOriginal | Replace unchanged entities. Keep changed entities and make them up-to-date if they are obsolete by updating their original versions. |

The different strategies and consequences have been described above in detail showing individual parts to clearly explain aspects of the present invention. Table 10 and Table 11 summarize the three effects for a cached entity that exists in the datasource (Table 10), and for an entity that does not exist in the datasource (Table 11).

TABLE 10

Merge strategy consequences for a cached entity that exists in the datasource.

| Merge Strategy | Is entity Obsolete? | | Unmodified | Added | Deleted | Detached | Modified | Is entity obsolete after merge? |
|---|---|---|---|---|---|---|---|---|
| | | | \multicolumn{5}{c|}{RowState before merge} | |
| PreserveChanges | N | Cur. Ver. | OW | NC | NC | NC | NC | N |
| | | Orig. Ver. | OW | NC | NC | NC | NC | |
| | | RowState | U | A | Dl | Dt | M | |
| | Y | Cur. Ver. | OW | NC | NC | NC | NC | Y |
| | | Orig. Ver. | OW | NC | NC | NC | NC | |
| | | RowState | U | A | Dl | Dt | M | |
| OverwriteChanges | Y or N | Cur. Ver. | OW | OW | OW | OW | OW | N |
| | | Orig. Ver. | OW | OW | OW | OW | OW | |
| | | RowState | U | U | U | U | U | |
| PreserveChangesUnlessOriginalObsolete | N | Cur. Ver. | OW | N/A | NC | NC | NC | N |
| | | Orig. Ver. | OW | | NC | NC | NC | |
| | | RowState | U | | Dl | Dt | M | |
| | Y | Cur. Ver. | OW | OW | OW | OW | OW | N |
| | | Orig. Ver. | OW | OW | OW | OW | OW | |
| | | RowState | U | U | U | U | U | |
| PreserveChangesUpdateOriginal | Y or N | Cur. Ver. | OW | NC | NC | NC | NC | N |
| | | Orig. Ver. | OW | OW | OW | OW | OW | |
| | | RowState | U | M | Dl | Dt | M | |
| PreserveEntityIfFoundInCache | N | Cur. Ver. | NC | NC | NC | NC | NC | N |
| | | Orig. Ver. | NC | NC | NC | NC | NC | |
| | | RowState | U | A | Dl | Dt | M | |
| | Y | Cur. Ver. | NC | NC | NC | NC | NC | Y |
| | | Orig. Ver. | NC | NC | NC | NC | NC | |
| | | RowState | U | A | Dl | Dt | M | |

A deleted RowState means that the entity is scheduled for deletion when it is next "saved" to the datasource.
OW = Overwrite,
NC = No change,
A = Added,
Dl = Deleted,
Dt = Detached,
M = Modified,
U = Unchanged,
N/A = Not applicable

TABLE 11

Merge strategy consequences for an entity that does not exist in the datasource.

| Merge Strategy | | Unmodified | Added | Deleted | Detached | Modified |
|---|---|---|---|---|---|---|
| | | \multicolumn{5}{c|}{RowState before merge} |
| PreserveChanges | Cur Ver | N/A | NC | NC | NC | NC |
| | Orig. Ver. | N/A | NC | NC | NC | NC |
| | RowState | Remove | A | Dl | Dt | M |
| OverwriteChanges | Cur Ver | N/A | NC | N/A | N/A | N/A |
| | Orig. Ver. | N/A | NC | N/A | N/A | N/A |
| | RowState | Remove | A | Remove | Remove | Remove |
| PreserveChangesUnlessOriginalObsolete | Cur Ver | N/A | NC | N/A | N/A | N/A |
| | Orig. Ver. | N/A | NC | N/A | N/A | N/A |
| | RowState | Remove | A | Remove | Remove | Remove |
| PreserveChangesUpdateOriginal | Cur Ver | N/A | NC | NC | NC | NC |
| | Orig. Ver. | N/A | NC | NC | NC | NC |
| | RowState | Remove | A | Dl | Dt | A |
| PreserveEntityIfFoundInCache | Cur Ver | NC | NC | NC | NC | NC |
| | Orig. Ver. | NC | NC | NC | NC | NC |
| | RowState | U | A | Dl | Dt | M |

Remove in the Table means remove the entity from cache.
N/A = Not applicable,
NC = No change,
A = Added,
Dl = Deleted,
Dt = Detached,
M = Modified,
U = Unchanged FIG. 3, generally at 300, illustrates one embodiment of the present invention. At 302 is a local object or entity having a local datastore (e.g. cache). Object 302 may query 306 one or more external data sources (e.g. data sources, datastores, etc.) 304. In reply to the query 306 a response 308 may be returned that may be optionally mapped or converted. The object 302 may issue a save 310 to the one or more external data sources 304. A local application may affect or modify 312 the local object 302 and/or its data.

Figure 4:
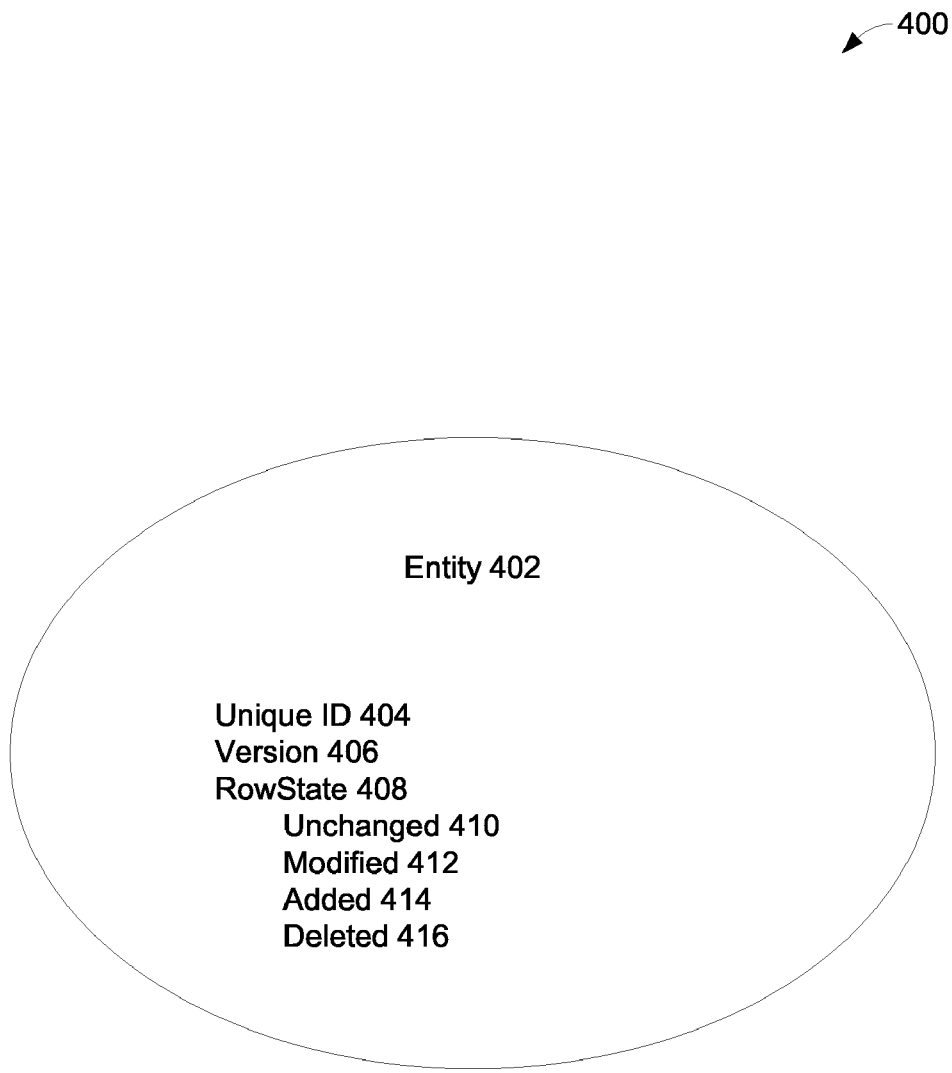
FIG. 4 illustrates one embodiment of the present invention showing an entity.

FIG. 4, generally at 400, illustrates one embodiment of the present invention. At 402 is an entity. Entity 402 has a unique ID (identification). For example, a unique key. Entity 402 has version 406. The version may be used to temporally distinguish between one or more entity 402 entities. Entity 402 has a status 408. The status 408 has four possible states. The states are unchanged 410, modified 412, added 414, and deleted 416. Multiple 402 entities may exist at any point in time. Each will have their own unique ID 404, however they may have the same or different version 406 and status 408 (including status states of unchanged 410, modified 412, added 414, and deleted 416).

FIG. 5, generally at 500, illustrates one embodiment of the present invention showing four Query Strategies. At 502 is a strategy column and at 504 is an action column related to each strategy.

At 506 is a Normal strategy that results in these actions 507: Search the cache first and then search the data source, excluding items found in the cache. Preserves cached entity changes; if we have a pending change (add, modify, delete), we will ignore conflicting values from the data source.

At 508 is CacheOnly that results in these actions 509: Search the cache only. Data source values are irrelevant. This query has no cache side-effects.

At 510 is DataSourceOnly that results in these actions 511: Search only in the data source, overwriting corresponding entities in the cache even if they have pending changes.

At 512 is DataSourceThenCache that results in these actions 513: Search the data source first, overwriting corresponding entities in the cache even if they have pending changes. Then search the cache for entities that satisfy the query but are not in the data source.

FIG. 6, generally at 600, illustrates one embodiment of the present invention showing four Fetch Strategies. At 602 is a strategy column and at 604 is an action column related to each strategy.

At 606 is a CacheThenDataSource strategy that results in these actions 607: Search the cache first and then search the data source for entities not already found in the cache.

At 608 is CacheOnly that results in these actions 609: Search the cache only. Ignore the data source.

At 610 is DataSourceOnly that results in these actions 611: Search only in the data source; return only the entities found in the data source.

At 612 is DataSourceThenCache that results in these actions 613: Search the data source first and then search the cache for entities that satisfy the query but are not in the data source.

FIG. 7, generally at 700, illustrates one embodiment of the present invention showing four Merge Strategies. At 702 is a strategy column and at 704 is an action when cached entity has pending changes column related to each strategy.

At 706 is a PreserveChanges strategy that results in these actions 707: Preserves the exact state of the cached entity. We won't be able to save the changes if the entity is obsolete.

At 708 is OverwriteChanges that results in these actions 709: Overwrites the cached entity with data from the data source and marks it Unchanged.

At 710 is PreserveChangesUnlessOriginalObsolete that results in these actions 711: Preserves the persistent state of the cached entity if the entity is up-to-date. Overwrites entity if it is obsolete and marks it Unchanged.

At 712 is PreserveChangesUpdateOriginal that results in these actions 713: Preserves the persistent state of the cached entity whether it is up-to-date or not. Turns an obsolete (non-up-to-date) changed entity into an up-to-date changed entity by overwriting the entity's original version with the just fetched values in the data source. Barring additional external updates, the entity can now be saved without a concurrency violation.

At 714 is NotApplicable that results in these actions 715: No merge action applies because there is no data source data. This merge strategy must be used—and may only be used—with the CacheOnly fetch strategy.

FIG. 8, generally at 800, illustrates one embodiment of the present invention showing four Query Strategies 802, such as but not limited to those in FIG. 5, defined in terms of Fetch Strategies 804, such as but not limited to those in FIG. 6 and Merge Strategies 806, such as but not limited to those in FIG. 7.

At 810 is a Normal query strategy defined in terms of an 812 CacheThenDataSource fetch strategy and an 814 PreserveChanges merge strategy. One of skill in the art will appreciate that is just one example of many possible definitions for this particular query strategy.

At 820 is a CacheOnly query strategy defined in terms of an 822 CacheOnly fetch strategy and an 824 NotApplicable merge strategy. One of skill in the art will appreciate that is just one example of many possible definitions for this particular query strategy.

At 830 is a DataSourceOnly query strategy defined in terms of an 832 DataSourceOnly fetch strategy and an 834 OverwriteChanges merge strategy. One of skill in the art will appreciate that is just one example of many possible definitions for this particular query strategy.

At 840 is a DataSourceThenCache query strategy defined in terms of an 842 DataSourceThenCache fetch strategy and an 844 OverwriteChanges merge strategy. One of skill in the art will appreciate that is just one example of many possible definitions for this particular query strategy.

One of skill in the art will also appreciate that many other query strategies may be defined in terms of other combinations of fetch and merge strategies. For example, another query strategy could be defined that used DataSourceThenCache as the fetch strategy and PreserveChangesUpdateOriginal as the merge strategy. Such combinations can be very powerful to describe the specific behavior that may be required by a sophisticated application.

Using the above approach as illustrated in FIG. 5, FIG. 6, FIG. 7, and FIG. 8 it is now possible in one embodiment of the invention to create a Query Strategy by defining it in terms of a Fetch strategy and a Merge strategy. In one embodiment this may be implemented in software by passing enumerations of the fetch and merge strategies to a Query Strategy constructor.

FIG. 9, generally at 900, illustrates one embodiment of the present invention showing defining one or more fetch strategies 902, defining one or more merge strategies 904, and defining one or more query strategies 906.

Figure 10:
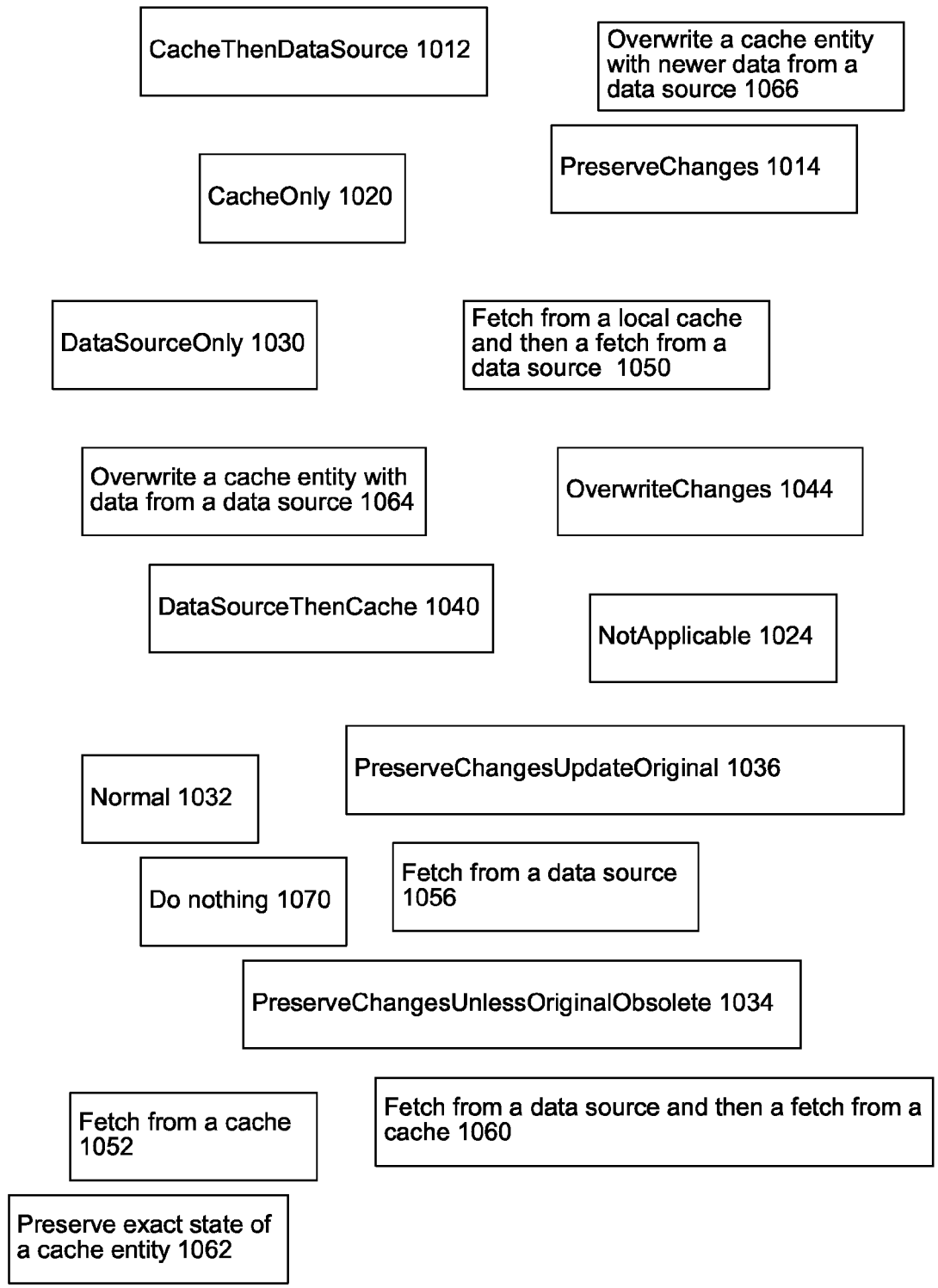
FIG. 10 illustrates one embodiment of the present invention showing some possible definitions for strategies.

FIG. 10, generally at 1000, illustrates one embodiment of the present invention showing a limited set of many possible definitions for strategies. CacheThenDataSource 1012. PreserveChanges 1014. OverwriteChanges 1044. NotApplicable 1024. PreserveChangesUpdateOriginal 1036. PreserveChangesUnlessOriginalObsolete 1034. Normal 1032. DataSourceThenCache 1040. DataSourceOnly 1030.

CacheOnly 1020. Fetch from a local cache and then a fetch from a data source 1050. Fetch from a cache 1052. Fetch from a data source 1056. Fetch from a data source and then a fetch from a cache 1060. Preserve exact state of a cache entity 1062. Overwrite a cache entity with data from a data source 1064. Overwrite a cache entity with newer data from a data source 1066. Do nothing 1070.

Figure 11:
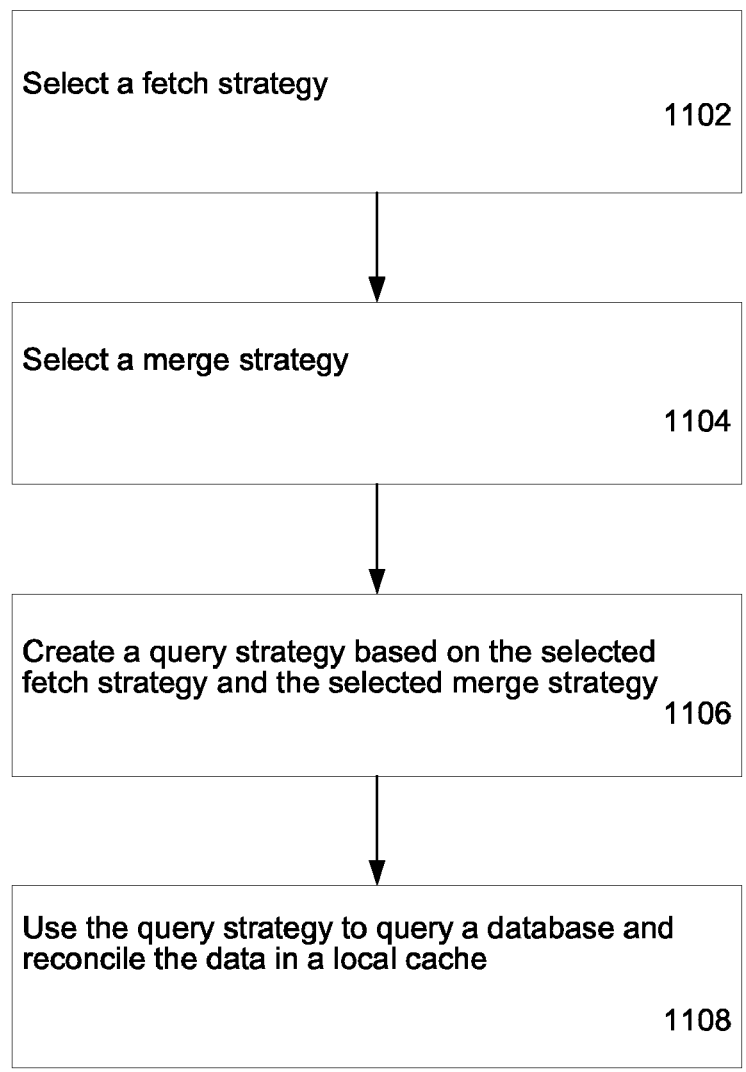
FIG. 11 illustrates one embodiment of the present invention in flow chart form.

FIG. 11, generally at 1100, illustrates one embodiment of the present invention in flow chart form. At 1102 a fetch strategy is selected. At 1104 a merge strategy is selected. At 1106 a query strategy is created based on the selected fetch strategy (1102) and the selected merge strategy (1104). At 1108 the created query strategy (1106) is used to query a database and reconcile the data in a local cache.

Figure 12:
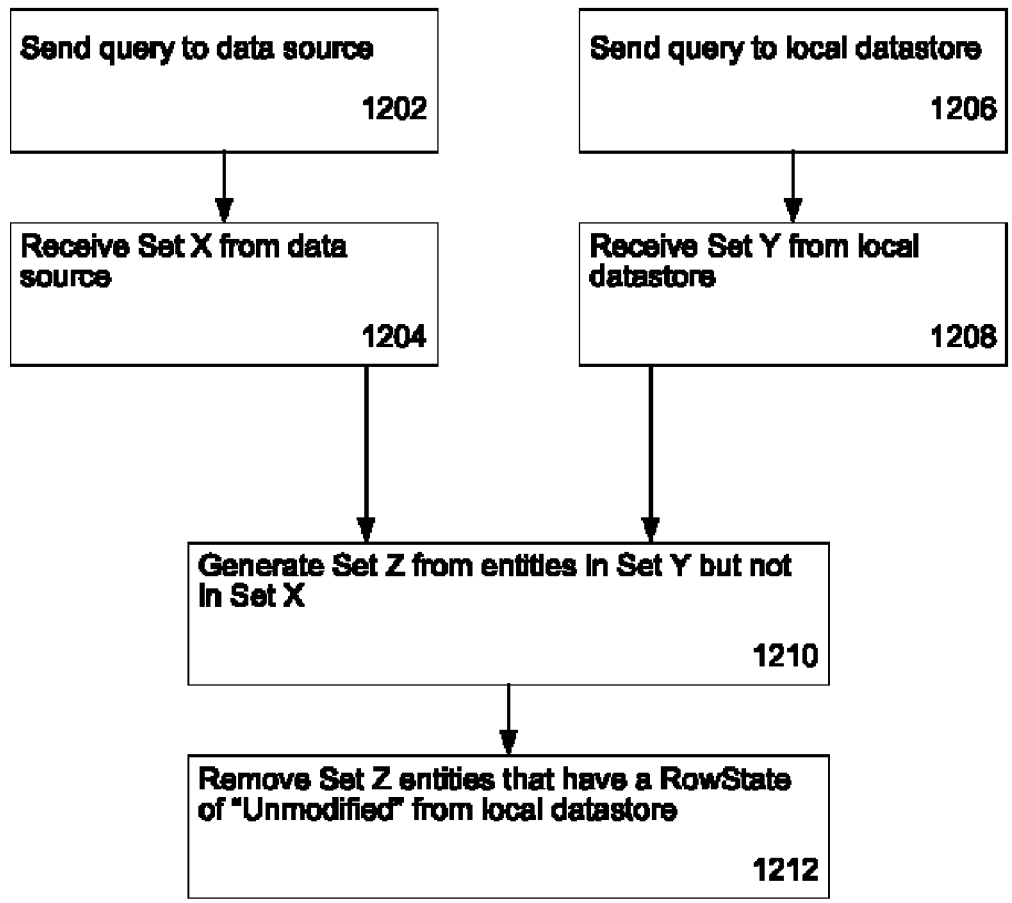
FIG. 12 illustrates one embodiment of the present invention in flow chart form for a non primary key query.

FIG. 12, generally at 1200, illustrates one embodiment of the present invention in flow chart form for merging/handling entities that are not found in the datasource for a non primary key query. At 1202 a query is sent to the data source. At 1204 the query result from the data source is received and denoted as Set X. At 1206 a query is sent to the local datastore. At 1208 the query result from the local datastore is received and denoted as Set Y. At 1210 Set Z is generated by taking the entities in Set Y that are not present in Set X., and at 1212 the entities in Set Z with a RowState of "Unmodified" are removed from the local datastore.

For example, in FIG. 12, assume data source has entities={0,1,2,3}, that local datastore={2,3,4,5} with all entities having a RowState of "Unmodified", that the query (1202, 1204) results in Set X={1,2,3}, the query (1206, 1208) results in Set Y={3,4,5}, then (1210) Set Z={4,5}, and (1212) the local datastore={2,3}.

Figure 13A:
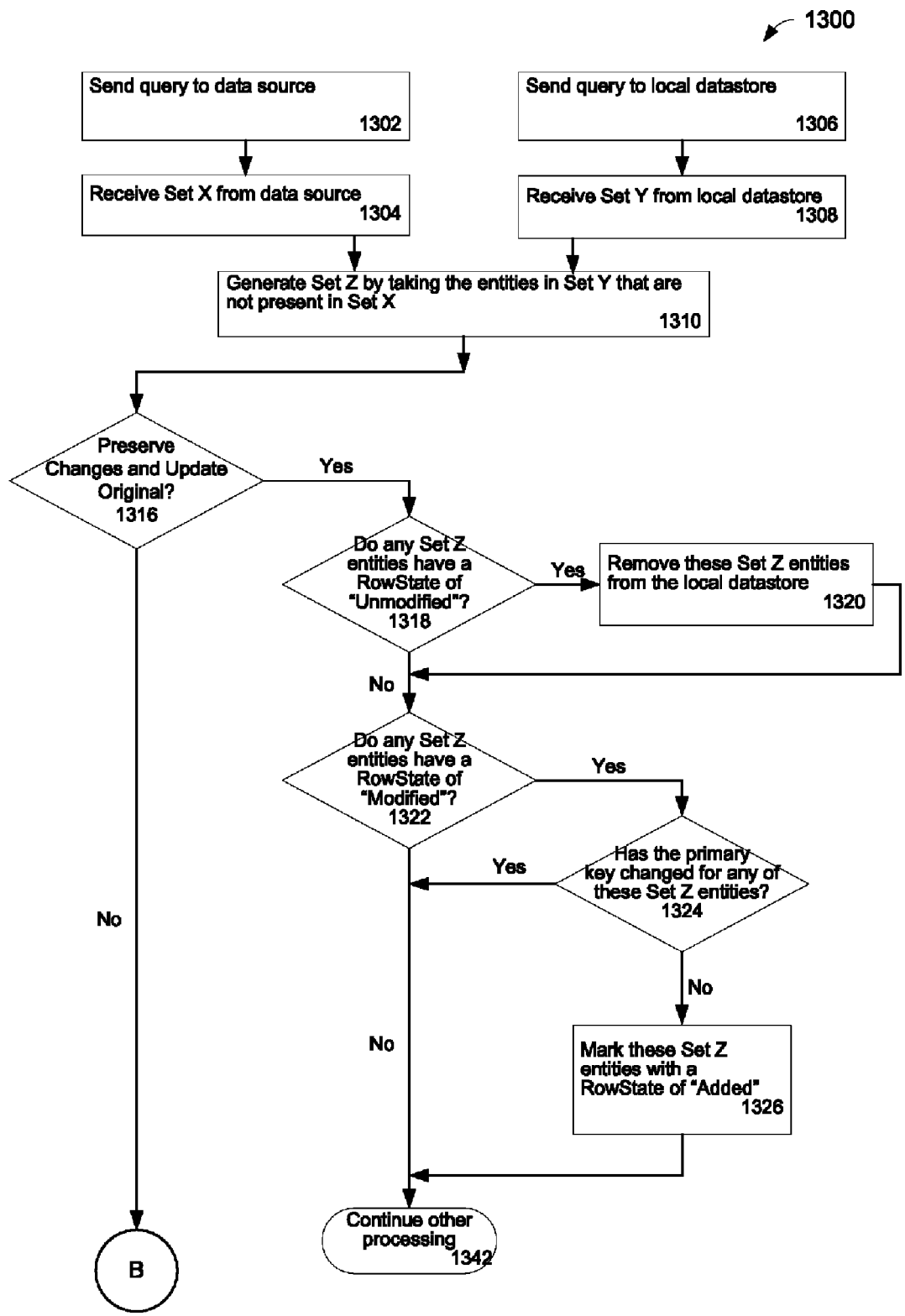
FIG. 13 illustrates one embodiment of the present invention in flow chart form for a primary key query.

FIG. 13A, generally at 1300, illustrates one embodiment of the present invention in flow chart form for merging/handling entities that are not found in the datasource for a primary key query. At 1302 a query is sent to the data source. At 1304 the query result denoted as Set X from the data source is received. At 1306 a query is sent to the local datastore. At 1308 the query result denoted as Set Y from the local datastore is received. At 1310 Set Z is generated by taking the entities in Set Y that are not present in Set X. At 1316 a check is made to see if we should preserve changes and update the original, if no then we proceed to another check (continuing from B in FIG. 13B), if yes then at 1318 a check is made to see if any Set Z entities have a RowState of "Unmodified". If yes then at 1320 those Set Z entities are removed from the local datastore and then we proceed to 1322. If no, then at 1322 a check is made to see if any of the entities in Set Z have a RowState of "Modified". If yes then at 1324 a check is made to see if the primary key for any of these entities as changed. If yes, then we continue other processing at 1342. If no, then these Set Z entities are marked with a RowState of "Added" at 1326. We then continue other processing at 1342.

Figure 13B:
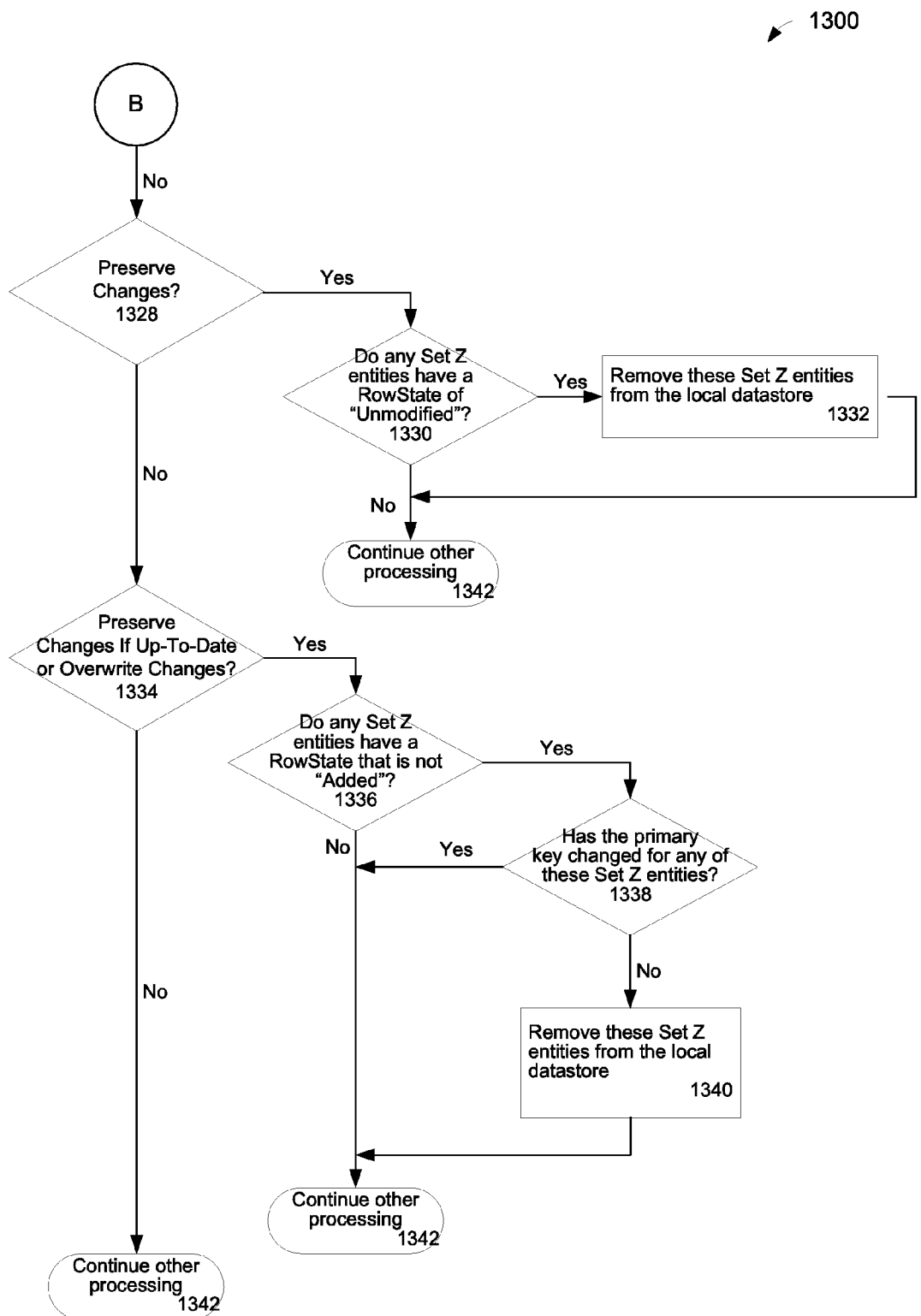

In FIG. 13B starting at B, at 1328 a check is made to see if we should preserve changes, if no then we proceed to another check (starting at 1334), if yes then at 1330 a check is made to see if any of the Set Z entities have a RowState of "Unmodified". If yes, then those Set Z entities are removed from the local datastore at 1332 and we continue other processing at 1342. If no, then we continue other processing at 1342. At 1334 a check is made to see if we should preserve changes if up-to-date or overwrite changes, if no then we can continue other processing 1342, if yes then at 1336 a check is made to see if any of the Set Z entities have a RowState that is not "Added". If no then we continue other processing at 1342. If yes, then a check is made at 1338 to see if the primary key has changed for any of these Set Z entities. If yes then we continue other processing at 1342. If no, then at 1340 we remove these Set Z entities from the local datastore, and then continue other processing at 1342.

Figure 3:
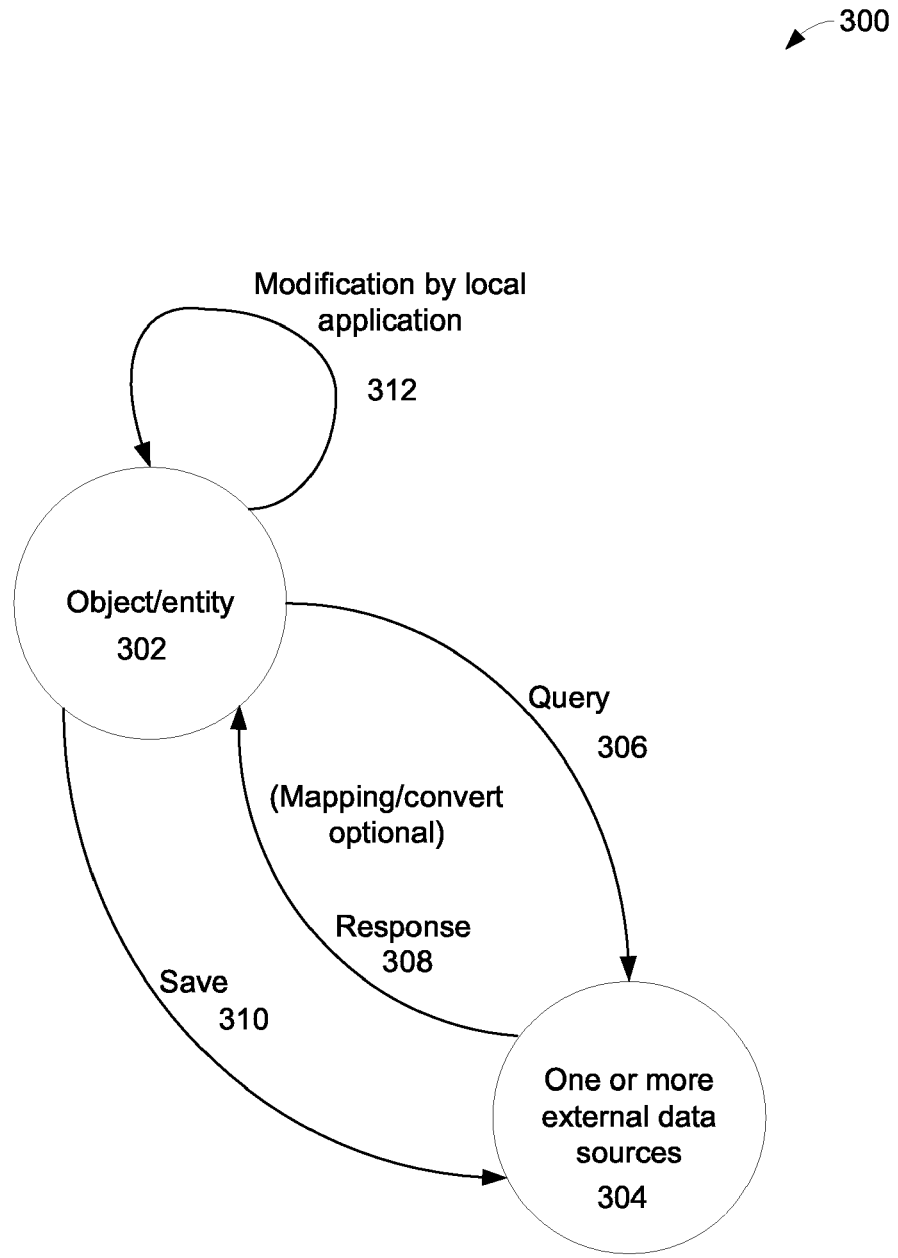
FIG. 3 illustrates one embodiment of the present invention in state type diagram.
Figure 14:
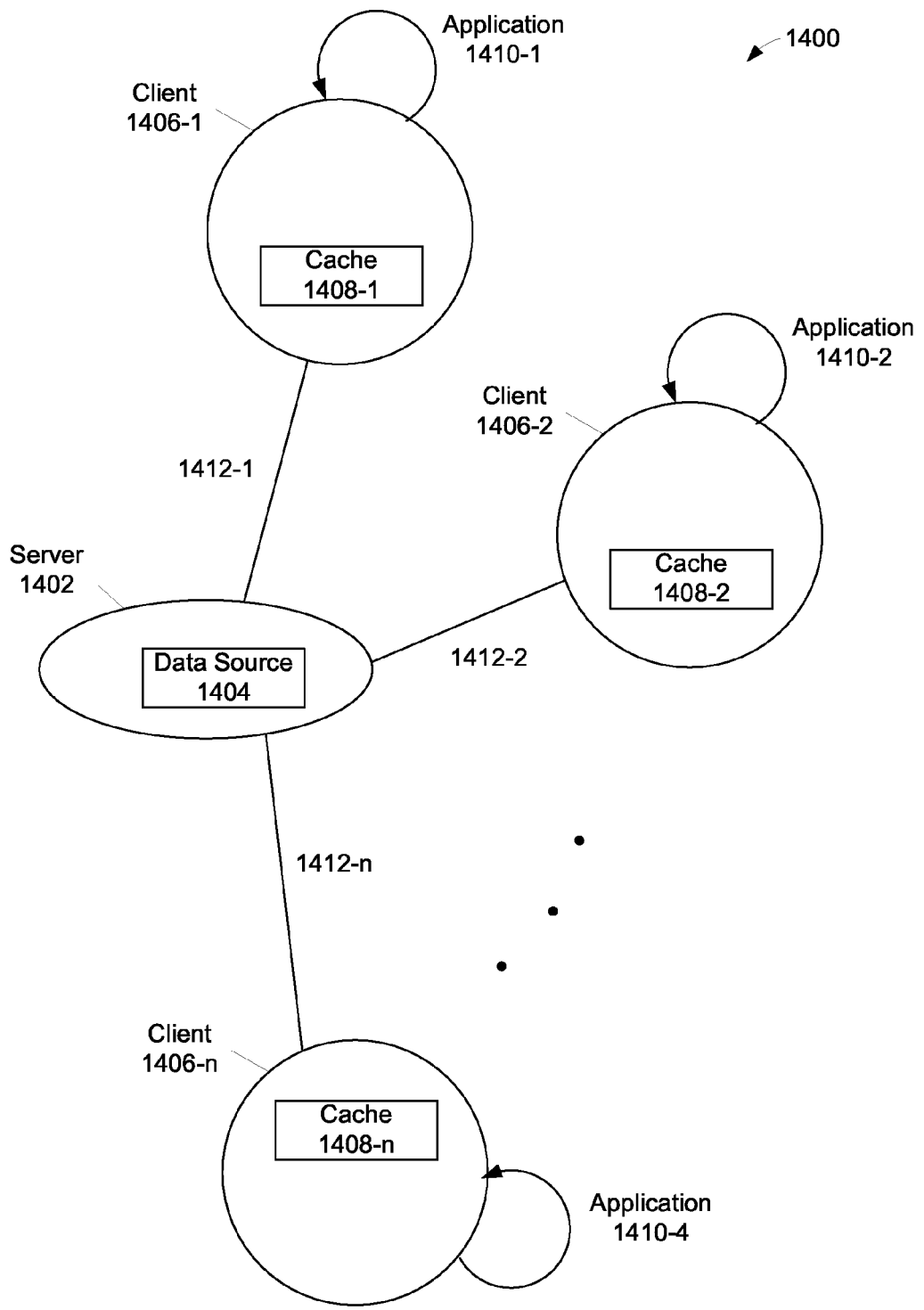
FIG. 14 illustrates one embodiment of the present invention.

FIG. 14 shows, generally at 1400, an embodiment of the present invention. For the sake of illustration a single server 1402 and multiple clients 1406-1, 1406-2, to 1406-n will be used to discuss distributed objects. The invention is not so limited and multiple servers may be connected to one or more clients and/or servers, etc. Each client (1406-1, 1406-2, to 1406-n) may be of type as shown in FIG. 3 connected to an external data source (such as data source in a server) or of a different configuration. In FIG. 14 the server 1402 has a data source 1404 which is capable of communication, when it is connected, to clients 1406-1, 1406-2, to 1406-n via links 1412-1, 1412-2, to 1412-n respectively. Each client (1406-1, 1406-2, to 1406-n) has a local cache (1408-1, 1408-2, to 1408-n respectively). Each client (1406-1, 1406-2, to 1406-n) also has one or more applications (1410-1, 1410-2, to 1410-n respectively). The applications (1410-1, 1410-2, to 1410-n) when running may query the data source 1404 via the communication links (1412-1, 1412-2, to 1412-n). If each application initially does a read query of the same data then each cache will have the same contents initially. Thus the distributed objects (e.g. the clients) are in sync. Each application may then operate independently on the data and alter their respective local copy in their cache. Because these operations are not generally identical, the result may be that the local caches differ from each other and from the data source. Additionally some clients may become disconnected from the server and the data source may change before the client becomes reconnected. Thus there may be different versions of data in the cache of the distributed objects and the server data source. Thus rules with respect to how the local cache is built up as well as query, fetch, and merge of data to itself and the server are necessary. The query strategies, fetch strategies, merge strategies, and other items discussed above allow a designer to create rules, strategies, techniques, etc. for performing dynamically adjustable reconciliation and management of data from the distributed objects cache.

FIG. 15 shows, generally at 1500, one embodiment of the invention showing in chart form different merge strategies and the effect on a cached entity that exists in a datasource. Across the top of the chart, labeling the columns are from left to right: 1502 Merge Strategy; 1504 Is entity Obsolete?; at 1506 RowState before merge, which in this example has the fields of: Unmodified 1508, Added 1510, Deleted 1512, Detached 1514, and Modified 1516; and 1518 Is entity obsolete after merge? Vertically down the left side under 1502 are five merge strategies: PreserveChanges 1520; OverwriteChanges 1530; PreserveChangesUnlessOriginalObsolete 1540; PreserveChangesUpdateOriginal 1550; and PreserveEntityIfFoundInCache 1560. At the intersection of a row and column is the operation or effect. For example, for a PreserveChangesUnlessOriginalObsolete 1540 merge strategy, in which the entity is Obsolete the rowstate of Cur. Ver. (i.e. current version) of Added is overwritten. Note that for a Preserve Local Cache Changes Unless Original Data Source Obsolete 1540 merge strategy, in which the entity is not obsolete with the rowstate of Added is not applicable because an up-to-date newly added entity cannot also exist in the data source. In FIG. 15, the following notations are used: Cur. Ver.=current version, Orig. Ver.=original version, OW=Overwrite, NC=No change, A=Added, Dl=Deleted, Dt=Detached, M=Modified, U=Unchanged, N/A=Not applicable, and also note that deleted RowState means that the entity is scheduled for deletion when it is next "saved" to the datasource.

FIG. 16 shows, generally at 1600, one embodiment of the invention showing in chart form different merge strategies and the effect on a cached entity that does not exist in a datasource. Across the top of the chart, labeling the columns are from left to right: 1602 Merge Strategy; at 1606 RowState before merge, which in this example has the fields of: Unmodified 1608, Added 1610, Deleted 1612, Detached 1614, and Modified 1616. Vertically down the left side under 1602 are five merge strategies: PreserveChanges 1620; OverwriteChanges 1630; PreserveChangesUnlessOriginalObsolete 1640; PreserveChangesUpdateOriginal 1650; and PreserveEntityIfFoundInCache 1660. At the intersection of a row and column is the operation or effect. For example, for a PreserveChangesUnlessOriginalObsolete 1640 merge strategy, in which the entity has a RowState before merge of Unmodified 1608 the RowState is Remove. In FIG. 16, the following notations are used: Cur. Ver.=current version, Orig. Ver.=original version, N/A=Not applicable, NC=No change, A=Added, DI=Deleted, Dt=Detached, M=Modified, U=Unchanged, and also note that Remove means to remove the entity from cache.

Figure 17:
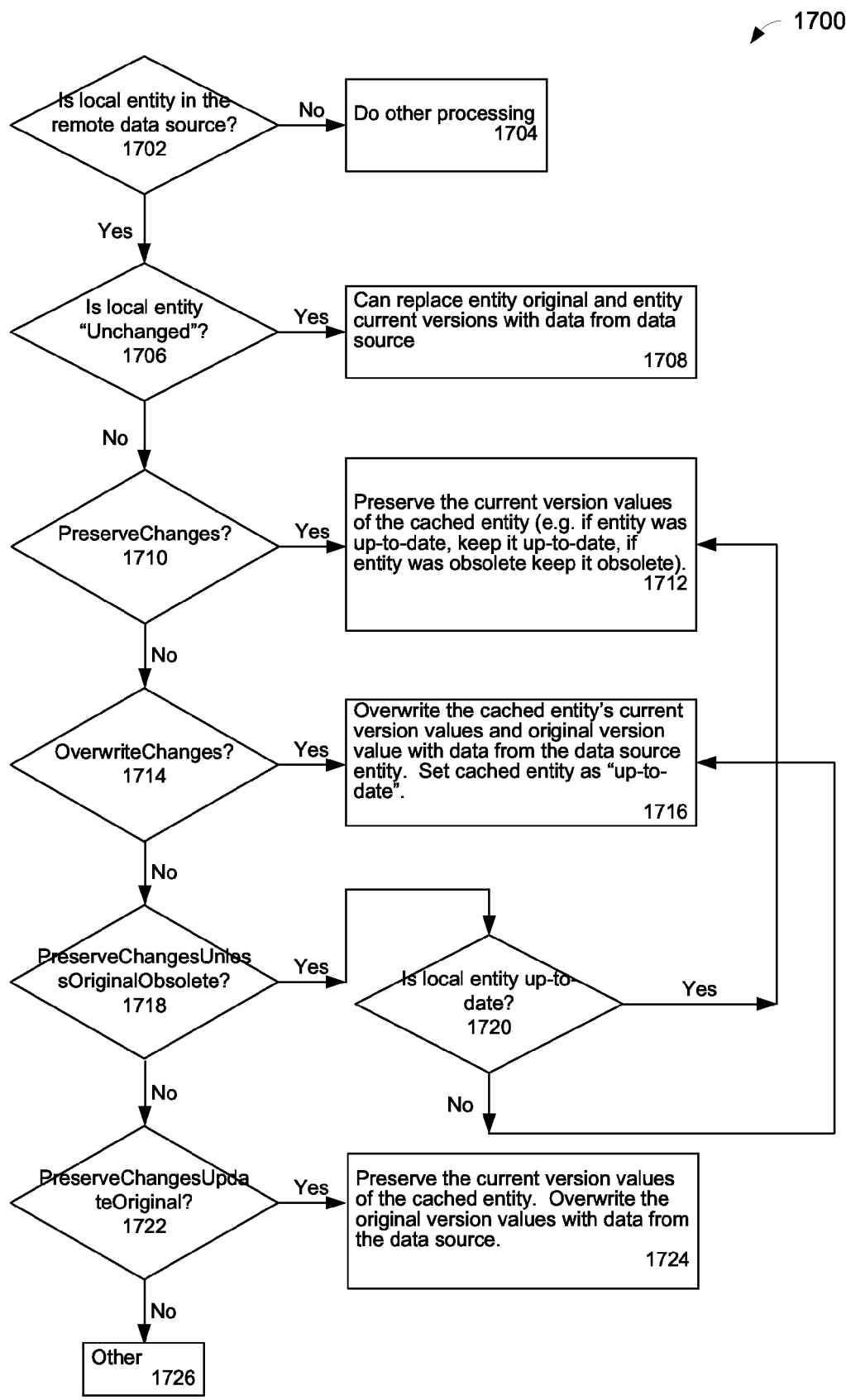
FIG. 17 illustrates one embodiment of the invention showing merging when an entity is in a data source.

FIG. 17 illustrates, generally at 1700, one embodiment of the invention showing merging when the entity (e.g. local) is in the data source (e.g. remote). At 1702 if the local entity is not in the remote data source then other processing is done at 1704. If at 1702 it is determined that the local entity is in the remote data source then at 1706 a check is made to see if the local entity is Unchanged. If the local entity at 1706 is unchanged then at 1708 the entity original and the entity current versions can be replaced with data from the data source. If at 1706 the local entity is other than Unchanged, then at 1710 a check is made to see if the merge strategy is to PreserveChanges, if no then proceed to 1714, if yes then at 1712 the current version values of the cached entity are preserved. For example, if the entity was up-to-date, then at 1712 it is kept up-to-date, if the entity was obsolete then at 1712 the entity is kept obsolete. At 1714 a check is made to see if OverwriteChanges is requested. If no then proceed to 1718, if yes then at 1716 the cached entity's current version values and original version values are overwritten with data from the data source and the cached entity is set as "Up-To-Date". At 1718 a check is made to see if the merge strategy of PreserveChangesUnlessOriginalObsolete is wanted. If no then proceed to 1722, if yes then at 1720 a check is made to see if the local entity is up-to-date. If the local entity is up-to-date at 1720 then proceed to 1712 where current version values of the cached entity are preserved. If the local entity is not up-to-date at 1720 then proceed to 1716 where the cached entity's current version values are overwritten with data from the data source and the cached entity is marked as up-to-date. At 1722 a check is made to see if a PreserveChangesUpdateOriginal merge is requested. If not then at 1726 other things may be done. If at 1722 a PreserveChangesUpdateOriginal merge is requested then at 1724 the current version values of the cached entity are preserved and the original version values are overwritten front he data source.

Figure 18:
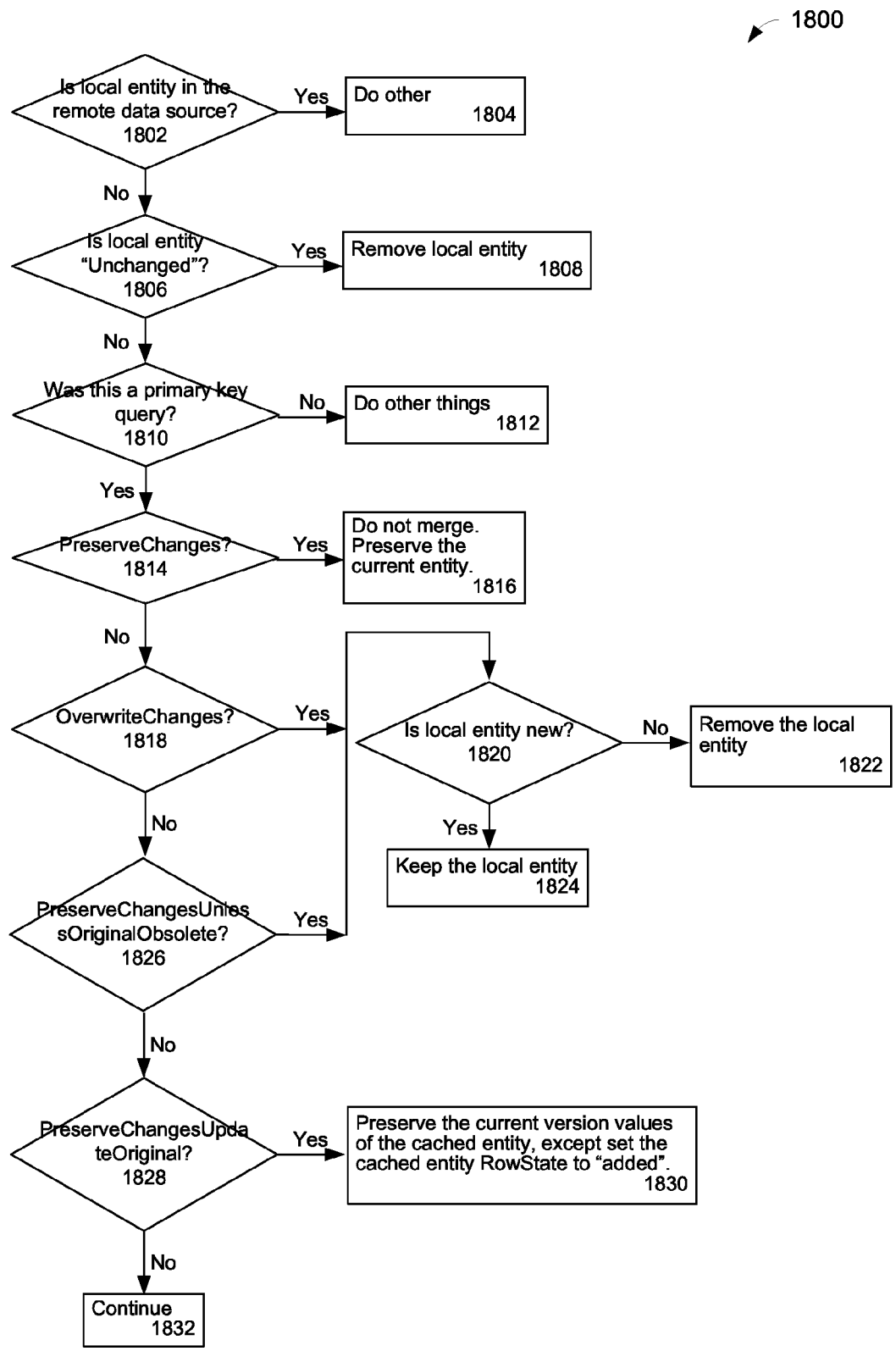
FIG. 18 illustrates one embodiment of the invention showing merging when a cached local entity is not in a data source.

FIG. 18, generally at 1800, illustrates merging when the cached local entity is not in the data source. At 1802 if the local entity is in the remote data source then do other at 1804. If at 1702 it is determined that the local entity is not in the remote data source then at 1806 a check is made to see if the local entity is Unchanged. If the local entity at 1806 is unchanged then at 1808 the local entity is removed. If the local entity at 1806 is not unchanged then at 1810 a check is made to see if the query was for a primary key. If the query was not for a primary key at 1810 then at 1812 do other things. If the query was for a primary key at 1810 then at 1814 a check is made to see if PreserveChanges is requested, and if no then proceed to 1818, if so then at 1816 no merge is performed and the current entity is preserved. At 1818 a check is made to see if OverwriteChanges is requested and if not then proceed to 1826, otherwise at 1820 a check is made to see if the local entity is new. If the local entity at 1820 is not new then at 1822 it is removed. If the local entity at 1820 is new then at 1824 the local entity is kept. At 1826 a check is made to see if PreserveChangesUnlessOriginalObsolete is requested and if not then proceed to 1828, otherwise proceed to 1820. At 1828 a check is made to see if PreserveChangesUpdateOriginal is requested and if not then proceed to 1832 and continue, otherwise at 1830 preserve the current version value of the cached entity except for setting the cached entity RowState to Added status.

Although the discussion of the invention above has used specific implementation examples, such as, using the fields (such as Version 406 or RowState 408) listed in FIG. 4 at Entity 402, one of skill in the art will appreciate that the methods and techniques described are broadly applicable even if these fields are not explicitly defined. To illustrate, instead of defining the version explicitly, one could compare all the fields and/or a hash of the fields to determine if the versions of the entities are the same. Information about the status of the entity, such as unchanged, modified, added, or deleted can also be derived using similar techniques. What is to be appreciated is that the techniques disclosed may be used with the concepts of ID, RowState, and Version even if they are not explicitly defined.

The above discussion has cited specific examples and attributes of entities, for example a unique ID, one of skill in the art will appreciate that an entity may use these concepts (such as an ID) without explicitly defining a field to hold it. For example, in a human resources (HR) application a business entity may hold, for example, a person's first name, last name, birth date, hire date, etc. In such an entity, the concept of uniqueness may be derived (rather than explicitly defined) by, for example, using the person's full name as the unique ID. Other approaches such as deriving an ID from a hash of the entity fields or using all the fields as a compound ID are also possible. What is to be appreciated is the techniques described above may be applied to the concept of uniqueness without having explicitly defined a unique ID.

Thus a method and apparatus for cache management of distributed objects have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
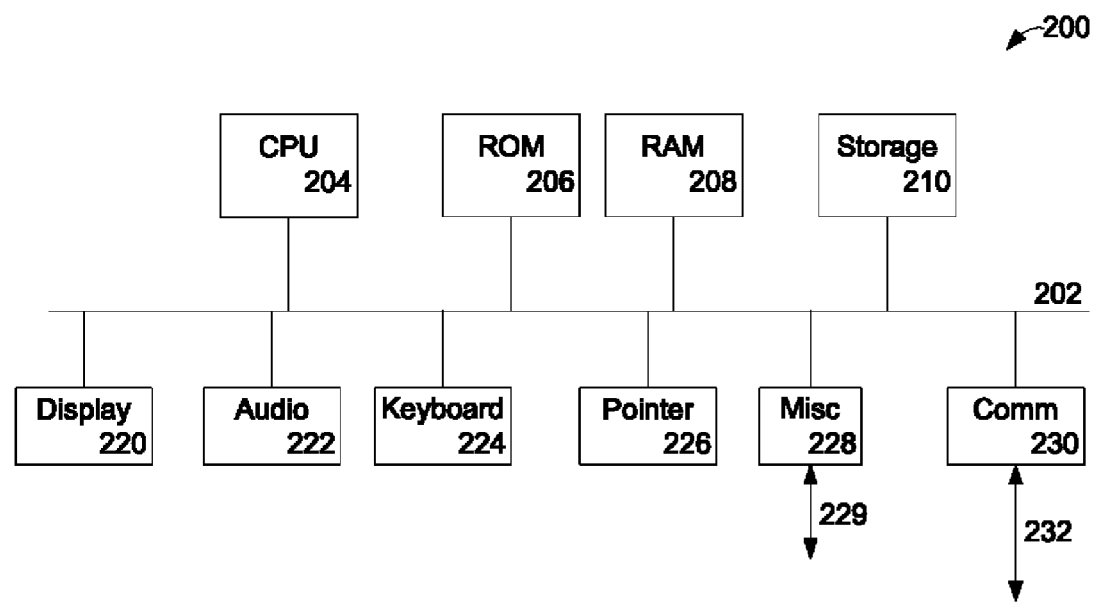
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities.

The method and apparatus described herein may be applied to essentially any type of communicating means or device whether local or remote, etc. Thus, the invention may find application at both the S servers 104-1 through 104-S, and C clients 108-1 through 108-C.

Further the method and apparatus described herein may be available and/or capabilities based on a variety of criteria. For example, certain features may be based upon communication of a payment and/or credit.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, I/O link 229, communications 230, and communications link 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those of skill in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory, and/or logic circuitry. These algorithmic descriptions and representations are the means used by those of skill in the arts to most effectively convey the substance of their work to others of skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, any of the methods according to the present invention can be implemented in hard-wired circuitry, by programmable logic, or by any combination of hardware and software.

An apparatus for performing the operations herein may implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

Further it is to be understood and appreciated that the performance of a method via computer or electronic hardware produces a concrete, useful, and tangible result such as, but not limited to, alteration of the number of physical electrons in a logic or memory device, producing a tangible result on an indicator or display device, etc.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.) capable of affecting a physical entity (e.g. movement) upon absorption and/or reflection of such; etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "detach", "detaching", or "detached" or similar phrases means to remove from the cache (e.g. the local datastore) and to not let anyone reference it. It is understood to be not valid.

As used in this description, "cache", "local cache", or "local datastore" or similar phrases means a local source and/or destination of data as compared with a more distant or remote source/destination of data, such as, a data source.

As used in this description, "RowState", "DataRowState", or similar phrases is understood by one of skill in the art to refer to the concept of the modification status of an object. For example, the status of Added, Deleted, Detached, Modified, or Unchanged object.

As used in this description, terms which are capitalized, have some letters capitalized, or run together, such as, but not limited to "Added", RowState, etc. whether in quotes or not are understood to be terms of art and either defined in this description or understood by one of skill in the relevant art. Additionally the terms may in certain contexts not be capitalized.

Thus a method and apparatus for cache management of distributed objects have been described.

What is claimed is:

1. A computer implemented method comprising:
   (a) determining when a cached entity has a corresponding existing entity in a datasource, and
   when said cached entity has said corresponding existing entity in said datasource then;
   (b) determining when a preserve changes to said cached entity merge strategy is requested for said cached entity merging with said corresponding existing entity in said datasource, and
   when said preserve change to said cached entity merge strategy is requested for said cached entity merging with said corresponding existing entity in said datasource then;
   (c) determining when said cached entity has a current version of said cached entity having a status of unmodified, and
   (c1) when said cached entity has said current version of said cached entity having said status of unmodified then;
   (c1a) replacing said current version of said cached entity with data from said corresponding existing entity in said datasource, replacing an original version of said cached entity with said data from said corresponding existing entity in said datasource,
   (c2) when said cached entity has said current version of said cached entity having said status of unmodified then;
   (c2a) leaving unchanged said status of said current version of said cached entity;
   and wherein said current version of said cached entity is stored in hardware on said computer and is displayed for a user.

2. The method of claim 1 further comprising:
   (d) determining when said cached entity has a current version of said cached entity having a status of other than unmodified, and
   (d1) when said cached entity has said current version of said cached entity having said status of other than unmodified then;
   (d1a) leaving unchanged said current version of said cached entity, leaving unchanged an original version of said cached entity, and wherein said current version of said cached entity is stored in hardware on said computer and is displayed for a user.

3. The computer implemented method of claim 2 further comprising:
   (d2) when said cached entity has said current version of said cached entity having said status of other than unmodified then;
   (d2a) leaving unchanged said status of said current version of said cached entity.

4. The method of claim 2 wherein said cached entity is not obsolete after said leaving unchanged said current version of said cached entity and leaving unchanged said original version of said cached entity.

5. A computer implemented method comprising:
  determining when a cached entity has a corresponding existing entity in a datasource, and
  when said cached entity has said corresponding existing entity in said datasource then;
    determining when an overwrite changes to said cached entity merge strategy is requested for said cached entity merging with said corresponding existing entity in said datasource, and
    when said overwrite changes to said cached entity merge strategy is requested for said cached entity merging with said corresponding existing entity in said datasource then;
      replacing a current version of said cached entity with data from said corresponding existing entity in said datasource,
      replacing an original version of said cached entity with said data from said corresponding existing entity in said datasource,
      changing a status to unmodified for a current version of said cached entity;
  wherein said cached entity is not obsolete after said replacing said current version of said cached entity with said data from said corresponding existing entity in said datasource and said replacing said original version of said cached entity with said data from said corresponding existing entity in said datasource and said changing said status to unmodified for said current version of said cached entity;
  and wherein said current version of said cached entity is stored in hardware on said computer and is displayed for a user.

6. A computer implemented method comprising:
  determining when a cached entity has a corresponding existing entity in a datasource, and
  when said cached entity has said corresponding existing entity in said datasource then;
    determining when a preserve changes unless an original version of said cached entity is obsolete merge strategy is requested for said cached entity with said corresponding existing entity in said datasource, and
    when said preserve changes unless said original version of said cached entity is obsolete merge strategy is requested for said cached entity with said corresponding existing entity in said datasource then;
      determining when said cached entity is not obsolete, and
      when said cached entity is not obsolete then;
        determining when said cached entity has a current version of said cached entity having a status of unmodified, and
        when said cached entity has said current version of said cached entity having said status of unmodified then;
          replacing a current version of said cached entity with data from said corresponding existing entity in said datasource, replacing an original version of said cached entity with said data from said corresponding existing entity in said datasource, and leaving unchanged said status of said current version of said cached entity, and wherein said current version of said cached entity is stored in hardware on said computer and is displayed for a user;
        when said cached entity has said current version of said cached entity having said status of other than unmodified then;
          leaving unchanged a current version of said cached entity, leaving unchanged an original version of said cached entity, and leaving unchanged said status of said current version of said cached entity, and wherein said current version of said cached entity is stored in hardware on said computer and is displayed for a user;
      determining when said cached entity is obsolete, and
      when said cached entity is obsolete then;
        replacing a current version of said cached entity with data from said corresponding existing entity in said datasource, replacing an original version of said cached entity with said data from said corresponding existing entity in said datasource, changing said status to unmodified for said current version of said cached entity, and wherein said current version of said cached entity is stored in hardware on said computer and is displayed for a user.

7. The method of claim 6 wherein said cached entity is not obsolete after said replacing said current version of said cached entity with data from said corresponding existing entity in said datasource.

8. A computer implemented method comprising:
  determining when a cached entity has a corresponding existing entity in a datasource, and
  when said cached entity has said corresponding existing entity in said datasource then;
    determining when a preserve changes and update an original version of said cached entity merge strategy is requested for said cached entity with said corresponding existing entity in said datasource, and
    when said preserve changes and update said original version of said cached entity merge strategy is requested for said cached entity with said corresponding existing entity in said datasource then;
      determining when said cached entity has a current version of said cached entity having a status of unmodified, and
      when said cached entity has said current version of said cached entity having said status of unmodified then;
        replacing said current version of said cached entity with data from said corresponding existing entity in said datasource,
        replacing an original version of said cached entity with said data from said corresponding existing entity it in said datasource, and leaving unchanged said status of said current version of said cached entity, and wherein said current version of said cached entity is stored in hardware on said computer and is displayed for a user;
      determining when said cached entity has a current version of said cached entity having a status of added, and
      when said cached entity has said current version of said cached entity having said status of added then;
        leaving unchanged said current version of said cached entity, replacing an original version of said cached entity with data from said corresponding existing entity in said datasource, and changing said status to modified for said current version of said cached entity, and wherein said current version of said cached entity is stored in hardware on said computer and is displayed for a user;

determining when said cached entity has a current version of said cached entity having a status of other than added and having a status of other than unmodified, and when said cached entity has said current version of said cached entity having said status of other than added and having said status of other than unmodified then;

leaving unchanged said current version of said cached entity, replacing an original version of said cached entity with data from said corresponding existing entity in said datasource, and leaving unchanged said status of said current version of said cached entity, and wherein said current version of said cached entity is stored in hardware on said computer and is displayed for a user.

9. The method of claim 8 wherein said cached entity is not obsolete after said replacing said original version of said cached entity with data from said corresponding existing entity in said datasource.

10. A computer implemented method comprising:
determining when a cached entity has a corresponding existing entity in a datasource, and
when said cached entity has said corresponding existing entity in said datasource then;
determining when a preserve said existing entity in said datasource when said existing entity in said datasource is found in a cache merge strategy is requested for said cached entity merging with said corresponding existing entity in said datasource, and
when a preserve said existing entity in said datasource when said existing entity in said datasource is found in said cache merge strategy is requested for said cached entity merging with said corresponding existing entity in said datasource then;
leaving unchanged a current version of said cached entity, leaving unchanged an original version of said cached entity, and leaving unchanged a status of said current version of said cached entity, and
wherein said current version of said cached entity is stored in hardware on said computer and is displayed for a user.

11. A computer implemented method comprising:
determining when a cached entity does not exist in a datasource, and
when said cached entity does not exist in said datasource then;
determining when a preserve changes to said cached entity merge strategy is requested for said cached entity merging with said datasource, and when said preserve changes to said cached entity merge strategy is requested for said cached entity merging with said datasource then;
determining when said cached entity has a current version of said cached entity having a status of unmodified, and
when said cached entity has said current version of said cached entity having said status of unmodified then;
removing said cached entity, and wherein a remove status related to said removing of said cached entity is stored in hardware on said computer and is displayed for a user;
determining when said cached entity has a current version of said cached entity having a status of other than unmodified, and when said cached entity has said current version of said cached entity having said status of other than unmodified then;
leaving unchanged a current version of said cached entity, leaving unchanged an original version of said cached entity, and leaving unchanged said status of said current version of said cached entity, and wherein said current version of said cached entity is stored in hardware on said computer and is displayed for a user.

12. A computer implemented method comprising:
determining when a cached entity does not exist in a datasource, and
when said cached entity does not exist in said datasource then;
determining when an overwrite changes to said cached entity merge strategy is requested for said cached entity merging with said datasource, and when said overwrite changes to said cached entity merge strategy is requested for said cached entity merging with said datasource then;
determining when said cached entity has a current version of said cached entity having a status of added, and
when said cached entity has said current version of said cached entity having said status of added then;
leaving unchanged a current version of said cached entity, leaving unchanged an original version of said cached entity, and leaving unchanged said status of said current version of said cached entity, and wherein said current version of said cached entity is stored in hardware on said computer and is displayed for a user;
determining when said cached entity has a current version of said cached entity having a status of other than added, and
when said cached entity has said current version of said cached entity having said status of other than added then;
removing said cached entity, and wherein a remove status related to said of said cached entity is stored in hardware on said computer and is displayed for a user.

13. A computer implemented method comprising:
determining when a cached entity does not exist in a datasource, and
when said cached entity does not exist in said datasource then;
determining when a preserve changes to said cached entity unless an original version of said cached entity is obsolete merge strategy is requested for said cached entity merging with said datasource, and
when said preserve changes to said cached entity unless said original version of said cached entity is obsolete merge strategy is requested for said cached entity merging with said datasource then;
determining when said cached entity has a current version of said cached entity having a status of added, and
when said cached entity has said current version of said cached entity having said status of added then;
leaving unchanged a current version of said cached entity, leaving unchanged an original version of said cached entity, and leaving unchanged said status of said current version of said cached entity, and wherein said current version of said cached entity is stored in hardware on said computer and is displayed for a user;
determining when said cached entity has a current version of said cached entity having a status of other than added, and
when said cached entity has said current version of said cached entity having said status of other than added then;
removing said cached entity, and wherein a remove status related to said removing of said cached entity is stored in hardware on said computer and is displayed for a user.

14. A computer implemented method comprising:

determining when a cached entity does not exist in a datasource, and when said cached entity does not exist in said datasource then;
determining when a preserve changes and update an original version of said cached entity merge strategy is requested for said cached entity merging with said datasource, and
when said preserve changes and update said original version of said cached entity merge strategy is requested for said cached entity merging with said datasource then;
determining when said cached entity has a current version of said cached entity having a status of unmodified, and
when said cached entity has said current version of said cached entity having said status of unmodified then;
removing said cached entity, and wherein a remove status related to said removing of said cached entity is stored in hardware on said computer and is displayed for a user;
determining when said cached entity has a current version of said cached entity having a status of modified, and
when said cached entity has said current version of said cached entity having said status of modified then;
leaving unchanged a current version of said cached entity, leaving unchanged an original version of said cached entity, and changing said status of said current version of said cached entity to added, and wherein said current version of said cached entity is stored in hardware on said computer and is displayed for a user;
determining when said cached entity has a current version of said cached entity having a status of other than modified and having a status of other than unmodified, and;
when said cached entity has said current version of said cached entity having said status of other than modified and having said status of other than unmodified then;
leaving unchanged a current version of said cached entity, leaving unchanged an original version of said cached entity, and leaving unchanged said status of said current version of said cached entity, and wherein said current version of said cached entity is stored in hardware on said computer and is displayed for a user.

15. A computer implemented method comprising:

determining when a cached entity does not exist in a datasource, and when said cached entity does not exist in said datasource then;
determining when a preserve said cached entity said cached entity is found in a cache merge strategy is requested for said cached entity merging with said datasource, and
when said preserve said cached entity if said cached entity is found in said cache merge strategy is requested for said cached entity merging with said datasource then;
leaving unchanged a current version of said cached entity, leaving unchanged an original version of said cached entity, and leaving unchanged said status of said current version of said cached entity, and wherein said current version of said cached entity is stored in hardware on said computer and is displayed for a user.

* * * * *